(12) United States Patent
Yamazaki et al.

(10) Patent No.: US 8,918,059 B2
(45) Date of Patent: Dec. 23, 2014

(54) BASE STATION, TERMINAL STATION, RADIO SYSTEM, RADIO CONTROL METHOD AND STORAGE MEDIUM

(75) Inventors: Kenichirou Yamazaki, Minato-ku (JP); Masayuki Ariyoshi, Minato-ku (JP); Kojiro Hamabe, Minato-ku (JP)

(73) Assignee: Nec Corporation, Tokyo (JP)

( * ) Notice: Subject to any disclaimer, the term of this patent is extended or adjusted under 35 U.S.C. 154(b) by 167 days.

(21) Appl. No.: 13/498,066

(22) PCT Filed: Sep. 17, 2010

(86) PCT No.: PCT/JP2010/066635
§ 371 (c)(1),
(2), (4) Date: Mar. 23, 2012

(87) PCT Pub. No.: WO2011/037215
PCT Pub. Date: Mar. 31, 2011

(65) Prior Publication Data
US 2012/0178377 A1 Jul. 12, 2012

(30) Foreign Application Priority Data
Sep. 24, 2009 (JP) ................................. 2009-218751

(51) Int. Cl.
*H04W 16/14* (2009.01)
*H04L 27/00* (2006.01)
*H04W 72/08* (2009.01)
*H04L 5/00* (2006.01)

(52) U.S. Cl.
CPC ............ *H04W 16/14* (2013.01); *H04W 72/085* (2013.01); *H04L 27/0006* (2013.01); *H04L 5/0007* (2013.01)
USPC ........ 455/67.11; 455/69.7; 455/62; 455/63.1; 455/440; 455/450

(58) Field of Classification Search
CPC . H04W 52/16; H04W 52/346; H04W 52/143; Y02B 60/50; H04B 1/1027; H04B 2201/709727; H04B 17/0042; H04B 17/0057; H04B 17/0062; H04B 17/0067; H04B 17/0095; H04B 1/707; H04B 7/0857; H04L 1/0009; H04L 1/0026; H04L 1/16
USPC .............. 455/69, 70, 62, 63.1, 440, 450, 451, 455/453, 452, 446, 448, 452.1–452.2, 522, 455/550.1, 561
See application file for complete search history.

(56) References Cited

U.S. PATENT DOCUMENTS

2004/0171402 A1* 9/2004 Tamaki et al. ................. 455/522
2010/0309854 A1* 12/2010 Wu et al. ........................ 370/329
(Continued)

FOREIGN PATENT DOCUMENTS

| JP | 2004-260637 A | 9/2004 |
|---|---|---|
| JP | 2008-079280 A | 4/2008 |

(Continued)

*Primary Examiner* — Fayyaz Alam
*Assistant Examiner* — Max Mathew
(74) *Attorney, Agent, or Firm* — Sughrue Mion, PLLC

(57) ABSTRACT

[Problem] Provided are a base station, a terminal station, a radio system, a radio control method and a storage medium capable of estimating with high accuracy a utilization status of a frequency band which is assigned to or of which a preferential use is permitted to another radio system.
[Solution] A base station of a radio system, which estimates a utilization status of a frequency band which is assigned to or of which a preferential use is permitted to another radio system, wherein the base station comprises an estimation means which estimates a utilization status of said frequency band, on the basis of a received signal power ratio between a received signal power value of the other radio systems and a received signal power value of the own radio system, which is obtained at least one sensing apparatus.

19 Claims, 29 Drawing Sheets

(56) References Cited

U.S. PATENT DOCUMENTS

2013/0102321 A1* 4/2013 Matsunaga ............... 455/452.2
2013/0170423 A1* 7/2013 Abe et al. .................. 370/312

FOREIGN PATENT DOCUMENTS

| JP | 2008-311745 A | 12/2008 |
| WO | 2007/080627 A1 | 7/2007 |

* cited by examiner

Fig.8

| RECEIVED SIGNAL POWER RATIO | RECEIVED SIGNAL POWER VALUE | |
|---|---|---|
| | EQUAL TO OR LARGER THAN THE THRESHOLD VALUE | SMALLER THAN THE THRESHOLD VALUE |
| EQUAL TO OR LARGER THAN THE THRESHOLD VALUE | ○ | ○ |
| SMALLER THAN THE THRESHOLD VALUE | ○ | × |

○ : ANOTHER RADIO SYSTEM IS USING
× : ANOTHER RADIO SYSTEM IS NOT USING

◇ SIGNAL POWER RATIO THRESHOLD VALUE = 5dB

◈ SIGNAL POWER RATIO THRESHOLD VALUE = 0dB

◊ SIGNAL POWER RATIO THRESHOLD VALUE = −5dB

◇ RECEIVED SIGNAL POWER RATIO = 5dB

◈ RECEIVED SIGNAL POWER RATIO = 0dB

◊ RECEIVED SIGNAL POWER RATIO = −5dB

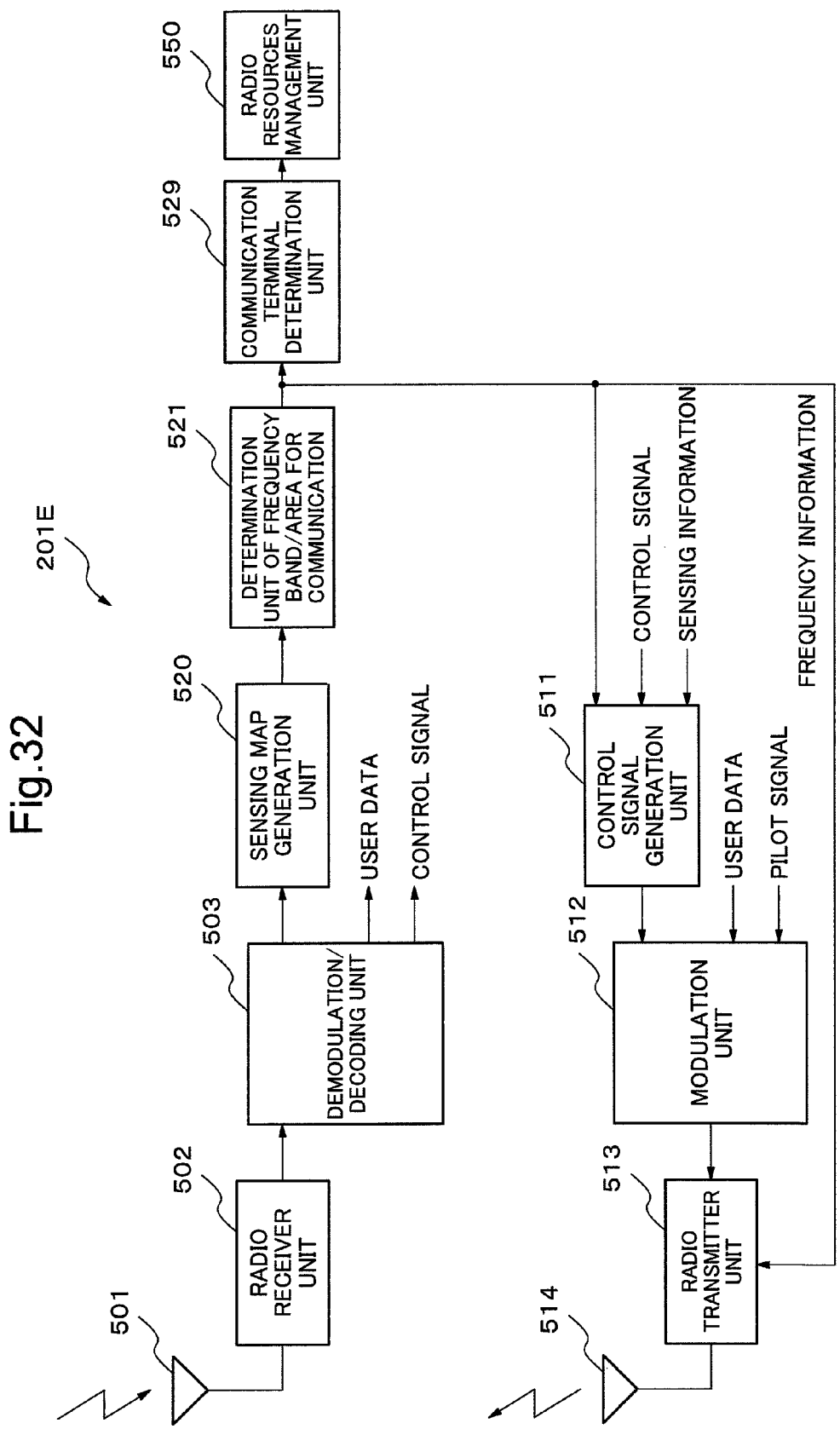

BASE STATION, TERMINAL STATION, RADIO SYSTEM, RADIO CONTROL METHOD AND STORAGE MEDIUM

CROSS-REFERENCE TO RELATED APPLICATIONS

This application is a National Stage of International Application No. PCT/JP2010/066635 filed Aug. 17, 2010, claiming priority based on Japanese Patent Application No. 2009-218751 filed Aug. 24, 2009, the contents of all of which are incorporated herein by reference in their entirety.

TECHNICAL FIELD

The present invention relates to a base station, a terminal station, a radio system, a radio control method and a storage medium.

BACKGROUND ART

In wireless communication, because of the finiteness of frequency resources, technology for efficient frequency utilization has been regarded as important. Accordingly, "cognitive radio" technology has attracted a lot of attention in recent years. Cognitive radio is a technology where, for example, from among all frequency bands targeted for use, a wireless base station itself searches for a frequency band which is currently not in use in the vicinity of the wireless base station, and use it for its communication. For example, when there exists in a radio system a frequency band which is currently unused, a base station of its own radio system may perform wireless communication using the frequency band. Accordingly, frequency resources can be used efficiently.

In a cognitive radio, a base station and a terminal station existing in an area covered by the base station detect a frequency band of which no radio wave exists. Here, as a method for detecting a frequency band of which no radio wave exists, for example, there can be mentioned a method where detection is performed in terms of a value of received signal power in each of the candidate frequency bands whose use for communication is desired, from among all frequency bands targeted for use.

Specifically, first, whole of the frequency bands targeted for use is divided into bands each having a constant bandwidth. Then, an RF (Radio Frequency) signal is converted to a baseband signal by the use of an RF circuit such as an orthogonal demodulator and a synthesizer which is operable over a wide range of bandwidth. A base station and a terminal station calculate a value of received signal power in each band, and search for a band for which the calculated value of received signal power is smaller than a predetermined threshold value. Also can be considered a method where a band of a small value of received signal power is searched for by changing a center frequency successively and calculating a value of received signal power in each band.

Here, a band of smaller value of received signal power than a threshold value can be considered to cause less interference on other radio systems or be less affected by the interference caused by other radio systems. Accordingly, such a band can be regarded as an empty frequency band, that is, it can be used for wireless communication.

In relation to the above description, for example, Patent Document 1 describes a method where; a base station or a terminal station existing in the area covered by the base station calculates a received signal power value in the vicinity of the base station or the terminal station on every frequency band targeted for use, and whether a band is empty or not is judged by comparing the calculated received signal powers with a predetermined threshold value. Patent Document 1 further describes an improvement in accuracy of the detection of an empty frequency band in the vicinity of the own base station by exchanging the calculation and judgment results between a plurality of base stations.

CITATION LIST

Patent Literature

[Patent Document 1] Japanese Patent Application Laid-Open No. 2008-79280

SUMMARY OF INVENTION

Technical Problem

However, in the case of Patent Document 1, as mentioned above, employed is a method where whether or not a frequency band is empty is judged by comparing its received signal power value and a threshold value. Here, for example, when a terminal station is present indoors, a radio wave is attenuated by the influence of a building penetration loss (a received signal power value at a receiver station is decreased). When a received signal power value is compared with a threshold value in such a condition, there is a risk that, despite the fact that the corresponding frequency band is actually in use, its received power value is judged as smaller than the threshold value (the frequency band is judged as empty). That is, highly accurate estimation of a utilization status of a frequency band is impossible with the method of Patent Document 1 (a method where whether a frequency band is empty or not is judged by comparing a received signal power with a threshold value).

The present invention is made to solve the above-mentioned problem, and is aimed at providing a base station, a terminal station, a radio system, a radio control method and a storage medium, which are capable of accurately estimating a utilization status of a frequency band which is assigned to or of which a preferential use is permitted to another radio system.

Solution to Problem

A base station of the present invention is a base station of its own radio system, which estimates a utilization status of a frequency band which is assigned to or of which a preferential use is permitted to another radio system, includes an estimation means which estimates a utilization status of the frequency band on the basis of a received signal power ratio between a received signal power value of the other radio system and that of the own radio system, which is obtained at least one sensing apparatus.

A terminal station of the present invention is a terminal station capable of communicating with the own radio system, includes an estimation means which estimates a utilization status of a frequency band which is assigned to or of which a preferential use is permitted to another radio system, on the basis of a received signal power ratio between a received signal power value of the other radio system and that of the own radio system, which is obtained at least one sensing apparatus.

A radio system of the present invention is a radio system including the own radio system and a terminal station capable of communicating or broadcasting with the own radio system, and includes an estimation means which estimates a utilization status of a frequency band which is assigned to or of which a preferential use is permitted to another radio system, on the basis of a received signal power ratio between a received signal power value of the other radio system and that of the own radio system, which is obtained at least one sensing apparatus.

A radio control method of the present invention is a radio control method, at a base station of the own radio system, which estimates a utilization status of a frequency band which is assigned to or of which a preferential use is permitted to another radio system, and is a method where a utilization status of the aforementioned frequency band is estimated on the basis of a received signal power ratio between a received signal power value of the other radio system and that of the own radio system, which is obtained at least one sensing apparatus.

A storage medium of the present invention is a storage medium storing a control program which is executed by a computer at a base station of the own radio system, and the control program includes a process of estimating a utilization status of the aforementioned frequency band on the basis of a received signal power ratio between a received signal power value of the other radio system and that of the own radio system, which is obtained at least one sensing apparatus.

Advantageous Effects of Invention

According to the present invention, it becomes possible to accurately estimate a utilization status of a frequency band which is assigned to or of which a preferential use is permitted to another radio system.

BRIEF DESCRIPTION OF THE DRAWINGS

FIG. 8 a table showing an example of a determination result at a comprehensive judgment unit shown in FIG. 6.

FIG. 32 a block diagram showing an illustrative configuration of a base station of the ninth illustrative embodiment.

DESCRIPTION OF EMBODIMENTS

The First Illustrative Embodiment

Figure 1:
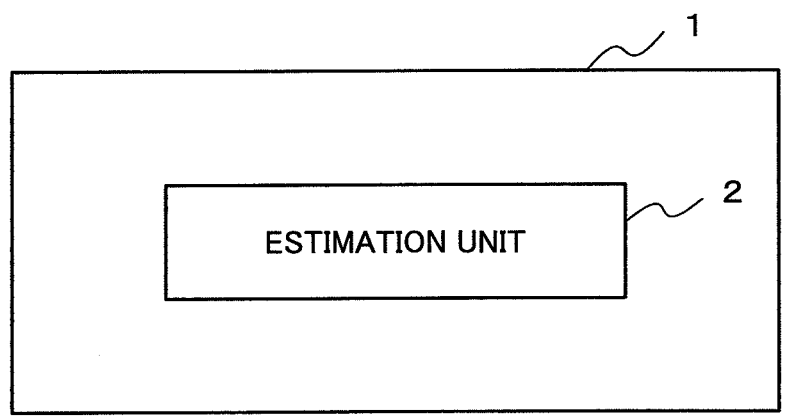
FIG. 1 a block diagram showing an illustrative configuration of a base station of the first illustrative embodiment according to the present invention.

FIG. 1 is a block diagram showing an illustrative configuration of a base station 1 of the first illustrative embodiment according to the present invention. A base station 1 belongs to its own radio system and estimates a utilization status of a frequency band which is assigned to or of which a preferential use is permitted to another radio system. Here, the base station 1 of the present illustrative embodiment comprises an estimation unit 2 (estimation means) which estimates a utilization status of the above-described frequency band, on the basis of a received signal power ratio between a received signal power value of the other radio system and that of the own radio system, which is obtained at least one sensing apparatus.

Here, for example, when a sensing apparatus is present indoors, a radio wave from a base station of the other radio system is attenuated by the influence of a building penetration loss. Accordingly, a received signal power value at the sensing apparatus is decreased. When the received signal power value thus becomes equal to or smaller than a threshold value, despite the fact that the frequency band subjected to the sensing is actually in use, it is regarded as an empty frequency band. On the other hand, in the case of a received signal power ratio, since it is a ratio between the radio waves both attenuated, the value (ratio) is not affected by the building penetration loss. Accordingly, the base station 1 of the first illustrative embodiment described above can estimate a utilization status of a frequency band with high accuracy, regardless of a location status of the sensing apparatus (for example, whether outdoors or indoors).

The Second Illustrative Embodiment

An outline of the present illustrative embodiment will be described below. In the present illustrative embodiment, a sensing apparatus (for example, a terminal station) existing in the base station of the own radio system or in a cover area of the base station (the area in which communication or broadcasting with the base station is possible) estimates whether or not another radio system is using a frequency band targeted for use. Here, the above-mentioned estimation is carried out using a received signal power ratio between a base station of the other radio system and the base station of the own radio system. On the basis of a result of the estimation, the base station or the sensing apparatus of the own radio system performs management of radio resources in terms of communication or broadcasting in the own radio system. As examples of the radio resources management, there can be mentioned selection of a frequency band to use, control of transmission power, and management of communication method/modulation method/coding rate and the like.

In the following, details of the present illustrative embodiment will be described.

Figure 2:
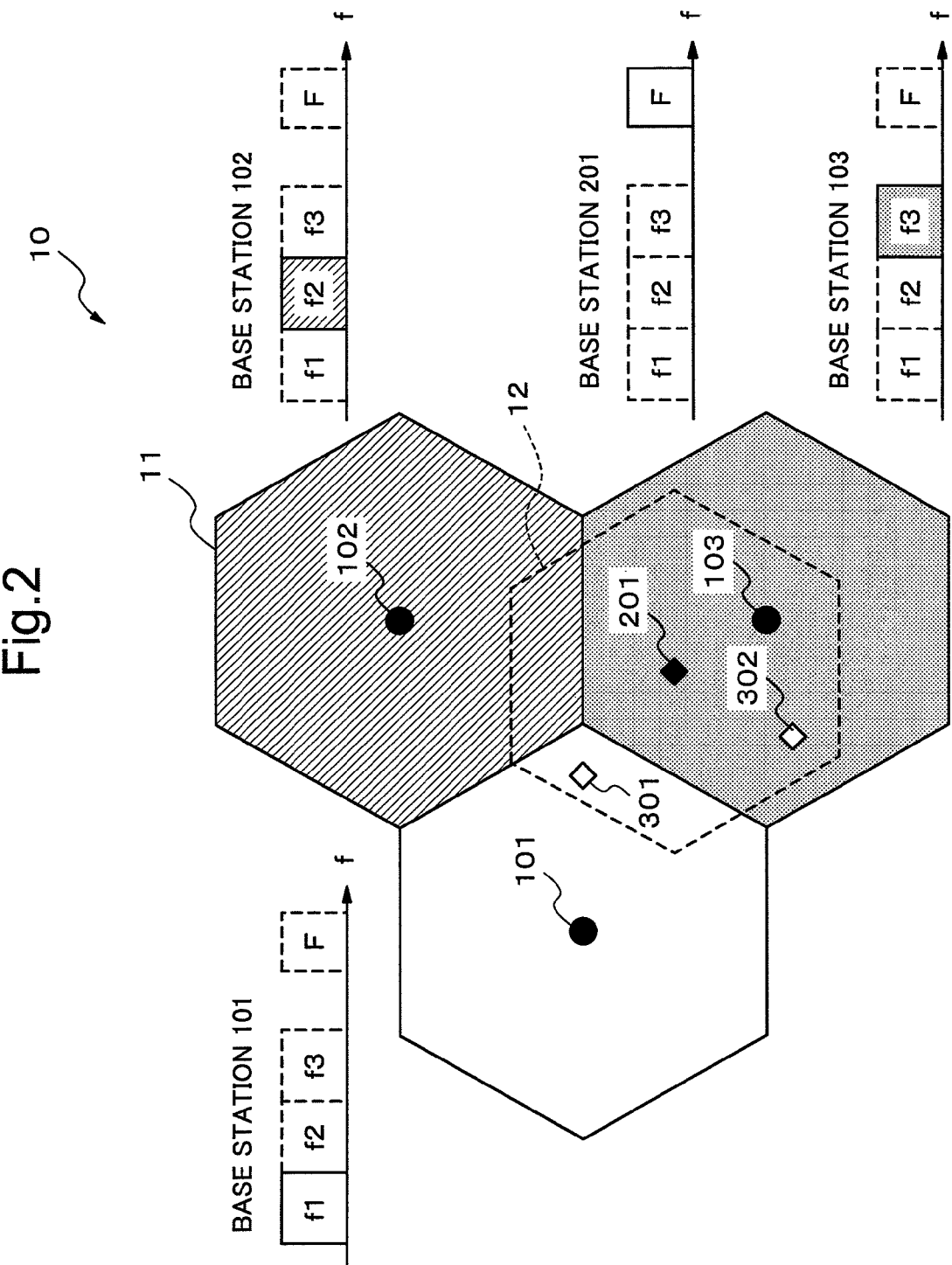
FIG. 2 a block diagram showing an example of a radio system of the second illustrative embodiment according to the present invention.

FIG. 2 is a system configuration diagram showing an example of a radio system 10 of the second illustrative embodiment according to the present invention. The radio system 10 includes another radio system 11 and an own radio system 12. To the other radio system 11, frequency bands f1, f2 and f3 are assigned or their preferential uses are permitted, as system bands. Further, the other radio system 11 includes base stations 101-103. In this case, the base station 101 uses the frequency band f1 from among the system bands. The base station 102 uses the frequency band f2 from among the system bands. The base station 103 uses the frequency band f3 from among the system bands.

The own radio system 12 includes a base station 201. The base station 201 is positioned so that its cover area overlaps with that of each of the base stations 101-103 of the other radio system 11. Here, for example, it is assumed that a frequency band F is assigned to or its preferential use is permitted to the own radio system 12. That is, in this case, the base station 201 of the own radio system 12 uses the frequency band F. Further, in the case of the present illustrative embodiment, it is assumed that terminal stations 301 and 302 (sensing apparatus) exist within the cover area of the base station 201.

Here, description will be given first of general functions of the terminal stations 301 and 302. The terminal stations 301 and 302 are provided with a function to communicate with the base station 201 of the own radio system 12 and a function to sense a frequency band the other radio system 11 uses (f1, f2 and f3 in the case of the present illustrative embodiment, for example). The terminal stations 301 and 302 existing in the cover area of the base station 201 of the own radio system perform the sensing of the frequency bands f1-f3, which are the targets of possible use by the own radio system, based on instructions from the base station 201, for example. The terminal stations 301 and 302 send sensing results (for example, a ratio between a power value of a signal received from a base station of the other radio system 11 and that of a signal received from the base station of the own radio system, which is obtained at each terminal station) to the base station 201 of the own radio system 12.

Next, general functions of the base station 201 will be described. Based on the sensing results collected from the terminal stations 301 and 302, for example, the base station 201 estimates utilization statuses of the frequency bands which are assigned to or of which preferential uses are permitted to the other radio system 11. Based on the estimation result, the base station 201 performs radio resources management in terms of communication or broadcasting in the own radio system 12. As examples of the radio resources management, there can be mentioned selection of a frequency band to use, control of transmission power, and management of communication method/modulation method/coding rate and the like.

Figure 3:
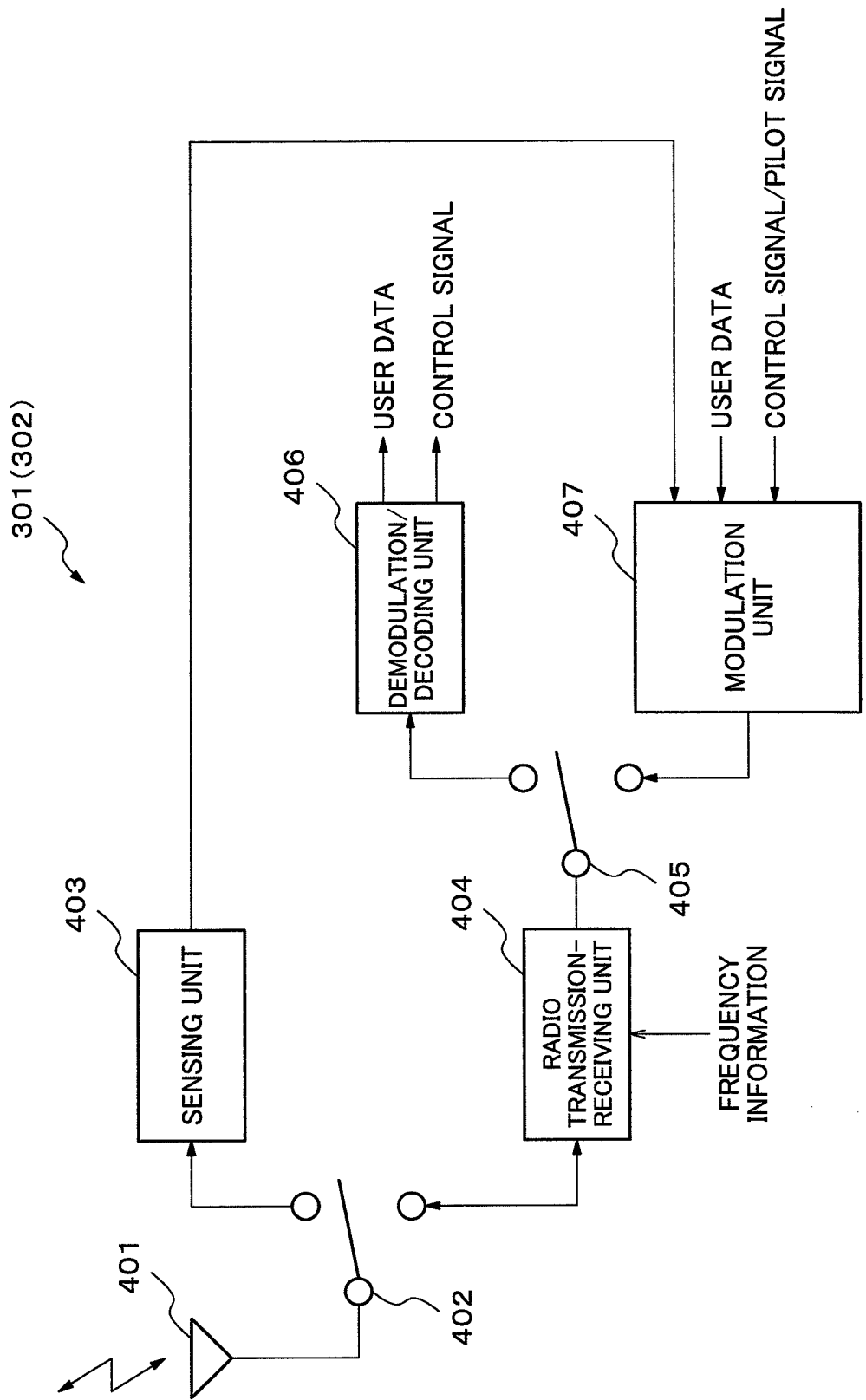
FIG. 3 a block diagram showing an illustrative configuration of a terminal station shown in FIG. 2.

FIG. 3 is a block diagram showing an illustrative configuration of the terminal stations 301 and 302 shown in FIG. 2. The terminal stations 301 and 302 comprise a transmission-receiving antenna 401, a switch 402, a sensing unit 403, a radio transmission-receiving unit 404, a switch 405, a demodulation/decoding unit 406 and a modulation unit 407.

The transmission-receiving antenna 401 is an antenna for both transmission and receiving which is capable of receiving and transmitting a radio signal. Receiving functions of the transmission-receiving antenna 401 include a function to receive a radio signal from each of the base stations 101-103 of the other radio system 11 (receiving function at the time of sensing), and a function to receive a radio signal from the base station 201 of the own radio system 12 (receiving function at normal state). Transmission functions of the transmission-receiving antenna 401 include a function to transmit a radio signal to the base station 201 of the own radio system 12. Here, the transmission-receiving antenna 401 may have a configuration in which it is separated into a receiving antenna and a transmission antenna.

The switch 402 connects the transmission-receiving antenna 401 with the sensing unit 403 when sensing is performed, and on the other hand, it connects the transmission-receiving antenna 401 with the radio transmission-receiving unit 404 when a sensing result is transmitted or normal communication is performed.

From signals received from the base stations 101-103 of the other radio system 11, the sensing unit 403 calculates received signal power values in the respective frequency bands used by the base stations. Further, the sensing unit 403 calculates a ratio between each power value of the signals received from the base stations 101-103 of the other radio system 11 and a power value of the signal received from the base station 201 of the own radio system 12 (received signal power ratio). The sensing unit 403 outputs these received signal power values and received signal power ratios as sensing results. The sensing result is transmitted, for example, to the base station 201 of the own radio system 12. Specifically, the sensing result is transmitted to the base station 201 via the modulation unit 407, switch 405, radio transmission-receiving unit 404, switch 402 and transmission-receiving antenna 401.

In the receiving process, the radio transmission-receiving unit 404 performs processes such as of received power amplification, down conversion and A/D conversion on a radio signal received via the transmission-receiving antenna 401, and outputs the signal having undergone the processes to the switch 405. In this case, the switch 405 connects the radio transmission-receiving unit 404 with the demodulation/decoding unit 406. The demodulation/decoding unit 406 demodulates and decodes a signal inputted via the switch 405, and outputs user data and a control signal.

In the transmission process, user data, a control signal and/or pilot signal, and sensing results outputted from the sensing unit 403 (for example, received signal power values and received signal power ratios) are inputted to the modulation unit 407. The modulation unit 407 performs processes such as of coding, interleaving, modulation and mapping on the above-mentioned inputted information, and outputs the resultant information to the switch 405. In this case, the switch 405 connects the modulation unit 407 with the radio transmission-receiving unit 404. On the signal from the switch 405, the radio transmission-receiving unit 404 performs processes such as of D/A (Digital/Analog) conversion, up conversion and transmission power amplification, and outputs the signal having undergone the processes to the transmission-receiving antenna 401 via the switch 402. Then, the signal having undergone the processes is transmitted to the base station 201 from the transmission-receiving antenna 401.

Figure 4:
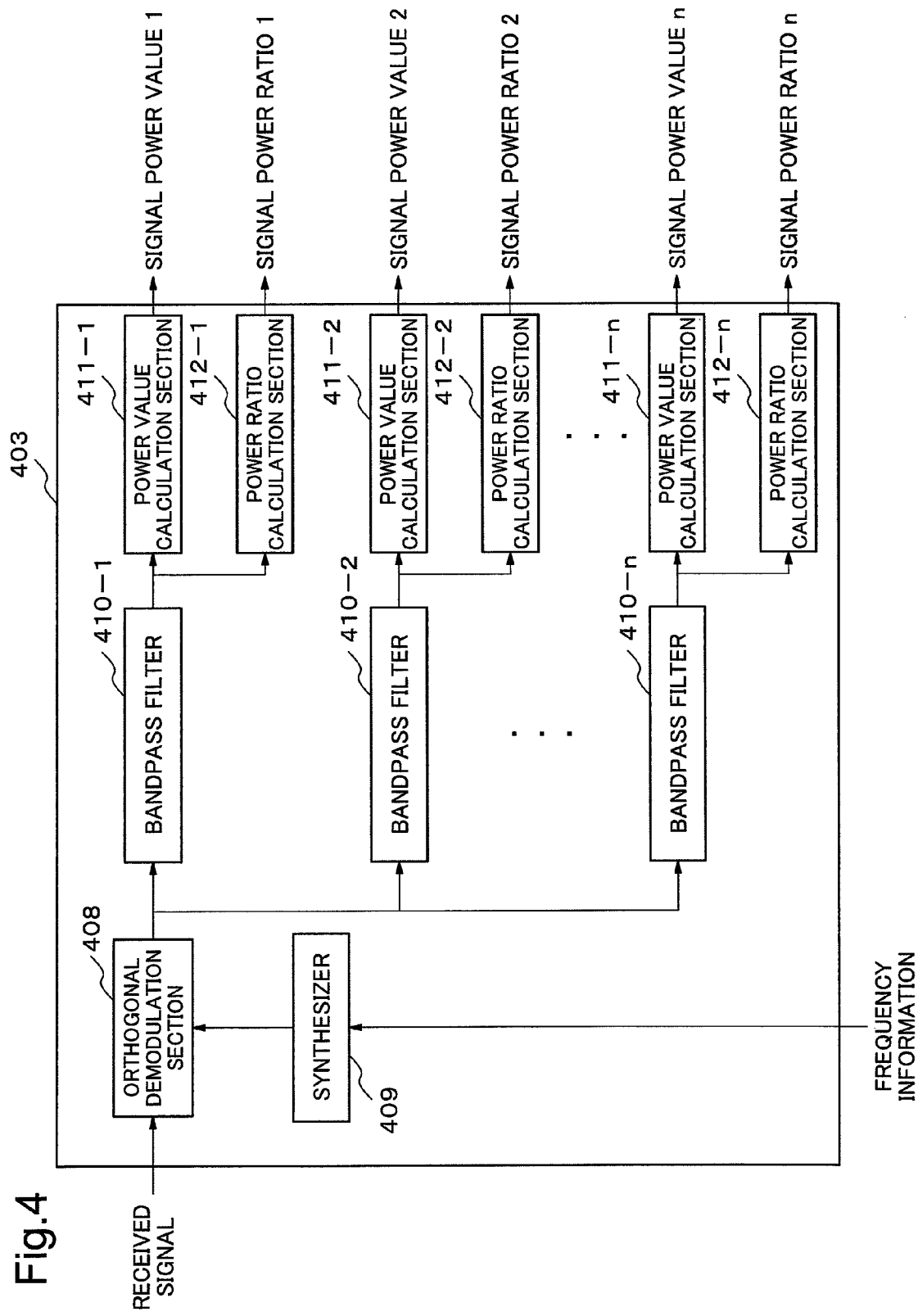
FIG. 4 a block diagram showing an illustrative configuration of a sensing unit constituting a terminal station shown in FIG. 3.

FIG. 4 is a block diagram showing a detailed illustrative configuration of a sensing unit 403 constituting the terminal stations 301 and 302 shown in FIG. 3 (that is, the terminal stations which are examples of sensing apparatuses and perform sensing). The sensing unit 403 comprises an orthogonal demodulation unit 408, a synthesizer 409, band-pass filters 410-1 to 410-$n$, power value calculation units 411-1 to 411-$n$ and power ratio calculation units 412-1 to 412-$n$. Here, n represents the number of frequency bands subjected to the sensing. That is, in the case of the present illustrative embodiment, n equals 3 since the three frequency bands f1, f2 and f3 are assigned to or their preferential uses are permitted to the other radio system 11.

The synthesizer 409 generates a frequency signal based on inputted frequency information and outputs it to the orthogonal demodulation unit 408. The orthogonal demodulation unit 408 demodulates a radio signal inputted from the transmission-receiving antenna 401 via the switch 402 using the above-mentioned frequency signal. Output of the orthogonal demodulation unit 408 is inputted to the band-pass filters 410-1 to 410-$n$. The band-pass filters 410-1 to 410-$n$ extract a signal in each of the frequency bands subjected to the sensing. Here, the frequency band subjected to the sensing by the band-pass filter 410-1 is f1. The frequency band subjected to the sensing by the band-pass filter 410-2 is f2. The frequency band subjected to the sensing by the band-pass filter 410-3 is f3.

Each of the band-pass filters 410-1 to 410-$n$ outputs the extracted signal to the power value calculation units 411-1 to 411-$n$ and to the power ratio calculation units 412-1 to 412-$n$. Here, for the purpose of calculating received signal power ratios between the base stations of the other radio system 11 and the base station of the own radio system 12, the band-pass filters 410-1 to 410-$n$ extract and output signals of the respective frequency bands (f1-f3 and F). The power value calculation units 411-1 to 411-$n$ calculate signal power values of the output signals from the band-pass filters 410-1 to 410-$n$, and output them as signal power value 1 to signal power value n. Using the signals of a plurality of frequency bands (that is, f1-f3 and F) outputted from the band-pass filters 410-1 to 410-$n$, the power ratio calculation units 412-1 to 412-$n$ calculate signal power ratios with respect to those signals and output them as signal power ratio 1 to signal power ratio n.

Here, signal power value 1 to signal power value n and signal power ratio 1 to signal power ratio n are transmitted as sensing results to the base station 201 of the own radio system 12. In this case, the transmitted information may be the signal power values and the signal power ratios themselves, and also may be in the form obtained by converting the signals into a specific signal format (for example, coding, quantization and the like).

Figure 5:
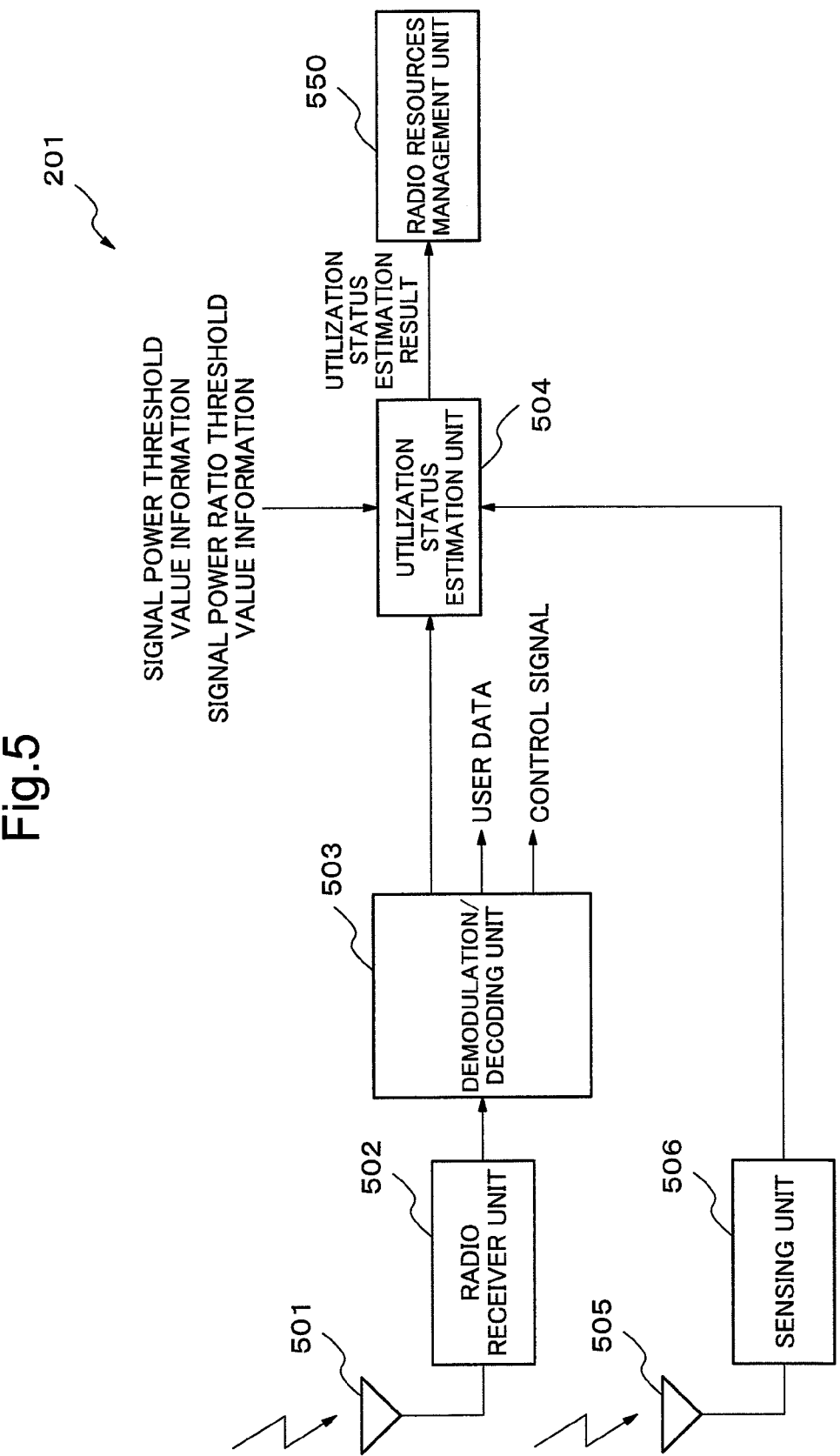
FIG. 5 a block diagram showing an illustrative configuration of a base station (its receiving part) of a radio system it inhabits (the own radio system) shown in FIG. 2.

FIG. 5 is a block diagram showing an illustrative configuration of the base station 201 (its receiving part) of the own radio system 12 shown in FIG. 2. The base station 201 (its receiving part) comprises a receiving antenna 501, a radio receiver unit 502, a demodulation/decoding unit 503, a utilization status estimation unit 504 (estimation means), a radio wave detection antenna 505, a sensing unit 506 and a radio resources management unit 550 (management means). The base station 201 estimates a frequency band the other radio system 11 is using, on the basis of sensing results at its own and that obtained at the terminal stations 301 and 302, A received signal received from the receiving antenna 501 is inputted to the radio receiver unit 502. The radio receiver unit 502 performs processes such as of received power amplification, down conversion and A/D conversion on a received radio signal, and outputs the signal having undergone the processes to the demodulation/decoding unit 503. The demodulation/decoding unit 503 performs demodulation and decoding processes on an inputted signal. The demodulation/decoding unit 503 outputs, for example, user data, a control signal, and sensing results. Here, the sensing results are received signal power values and received signal power ratios obtained at the terminal stations 301 and 302. The sensing results are inputted to the utilization status estimation unit 504.

When sensing of the other radio system 11 is performed also at the base station 201, the sensing unit 506 calculates received signal powers of the other radio system 11 using a signal received by the radio wave detection antenna 505, and outputs the calculation results to the utilization status estimation unit 504. Here, the configuration of the sensing unit 506 becomes that obtained by removing the power ratio calculation units 412-1 to 412-n from the sensing unit 403 in the terminal stations 301 and 302 (refer to FIG. 4).

The utilization status estimation unit 504 estimates a utilization status of a frequency band the other radio system 11 is using, and outputs the result as a "utilization status estimation result". Specifically, the utilization status estimation unit 504 estimates the above-mentioned utilization status, using the sensing results at the terminal stations 301 and 302 (for example, received signal power values and received signal power ratios) inputted from the demodulation/decoding unit 503, and using signal power threshold value information and signal power ratio threshold value information, each provided as external input.

On the basis of the "utilization status estimation result", the radio resources management unit 550 performs management of radio resources to be used for communication or broadcasting between the base station 201 and the terminal stations 301 and 302 (for example, selection of a frequency band to use, transmission power control, or management of communication method/modulation method/coding rate and the like).

When the sensing of the other radio system 11 is not performed at the base station 201, from among the components in the configuration of the base station 201, the radio wave detection antenna 505 and the sensing unit 506 are unnecessary. In this case, the utilization status estimation unit 504 estimates a utilization status of a frequency band the other radio system 11 is using, only using the above-mentioned sensing results at the terminal stations 301 and 302 outputted from the demodulation/decoding unit 503.

Figure 6:
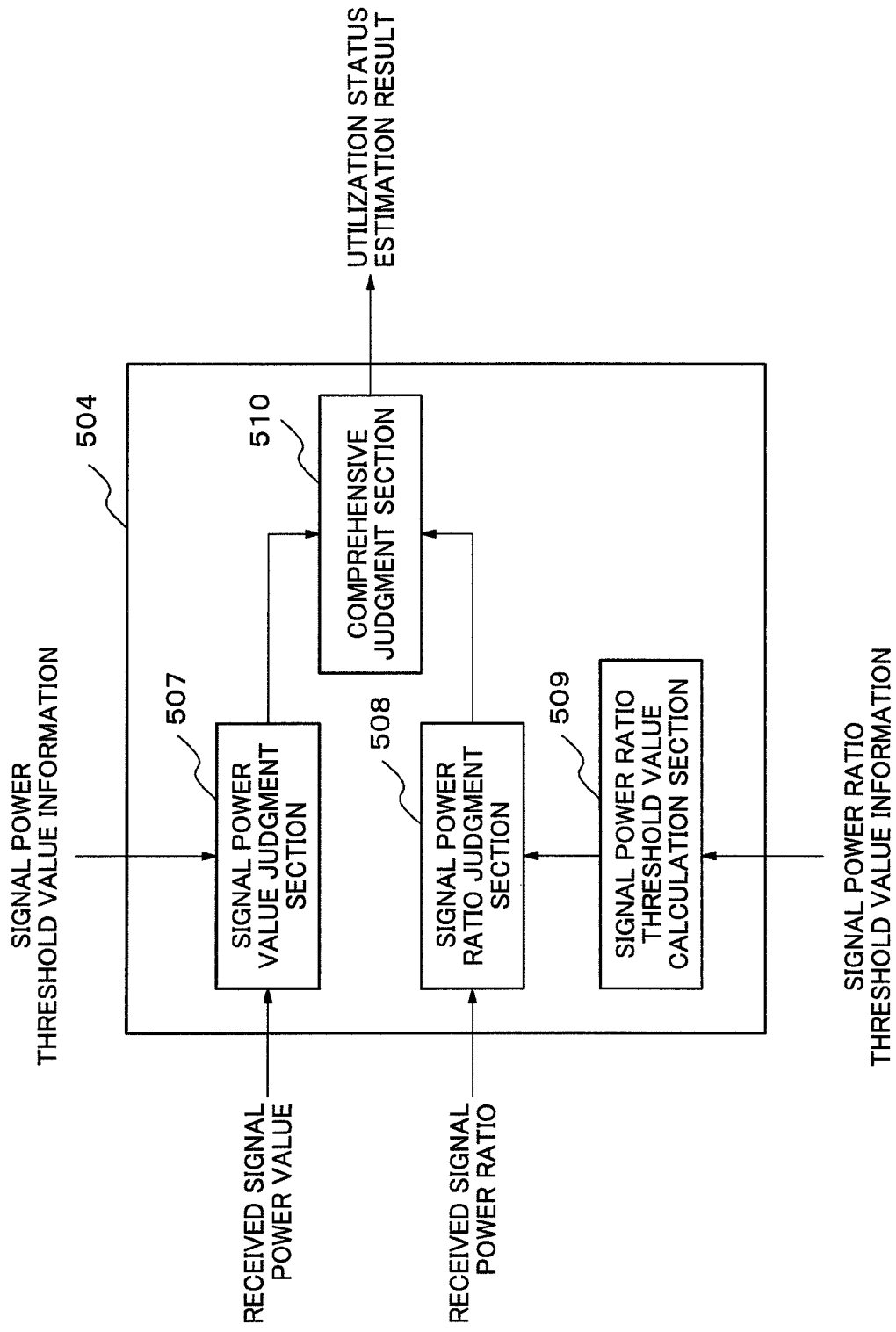
FIG. 6 a block diagram showing an illustrative configuration of a utilization status estimation unit shown in FIG. 5.

FIG. 6 is a block diagram showing an illustrative configuration of the utilization status estimation unit 504 shown in FIG. 5. The utilization status estimation unit 504 comprises a signal power value judgment unit 507, a signal power ratio judgment unit 508, a signal power ratio threshold value calculation unit 509 (threshold value determination means) and a comprehensive judgment unit 510.

As described below, while each process performed in the utilization status estimation unit 504 is a "judgment" process, output itself of the utilization status estimation unit 504 is substantially a value of "estimation". It is because a judgment result of whether a frequency band is used or not itself is an estimated value depending on a signal power ratio threshold value and a signal power threshold value, and thus is not a value exactly corresponding to a utilization status. Therefore, basically in the following description, "judgment" will be used with respect to the processes performed in the utilization status estimation unit 504 (comparison with a threshold value and final determination of the comparison results), and "estimation" is used with respect to outputted results from the utilization status estimation unit 504.

Received signal power values and received signal power ratios outputted from the demodulation/decoding unit 503 are inputted respectively to the signal power value judgment unit 507 and the signal power ratio judgment unit 508.

Specific information on a received signal power value predetermined at the other radio system 11 is inputted to the signal power value judgment unit 507 as signal power threshold value information, and is set there as a "signal power threshold value". The signal power value judgment unit 507 compares a received signal power value with the "signal power threshold value", and outputs the comparison result to the comprehensive judgment unit 510. Here, the comparison result is outputted in a digitized form. For example, the comparison result may be defined to be 1 when a received signal power value is equal to or larger than the threshold value, and be 0 when smaller than the threshold value.

Here, the specific information on a received signal power value predetermined at the other radio system 11 is a required value of a received signal power which is specified at the other radio system 11, and it may be either a fixed value or a variable value. This specified value may be set acquiring the specific information of the other radio system 11 in advance, and, when it is a variable value, may be set acquiring the specific information of the other radio system 11 every time when the value is changed. As a way of acquiring the information, there can be mentioned a way where the acquisition is performed connecting to the other radio system 11 by wire or wireless, or a way where it is performed accessing such as a database containing the specified value.

The signal power ratio judgment unit 508 compares a received signal power ratio with a "signal power ratio threshold value" outputted from the signal power ratio threshold value calculation unit 509, and outputs the comparison result to the comprehensive judgment unit 510. Here, the comparison result is outputted, for example, in a digitized form. For example, the comparison result may be defined to be 1 when a received signal power ratio is equal to or larger than the threshold value, and be 0 when smaller than the threshold value.

Here, when sensing results from a plurality of terminal stations are obtained about an identical frequency band, the utilization status estimation unit 504 can also perform the estimation of a utilization status using the plurality of sensing results. For example, it is possible to calculate average values (summation average or weighting summation average) of received signal power values and received signal power ratios, all of which are sent from a plurality of terminal stations, respectively, and then to estimate a utilization status using the calculated average values.

Here, weighting coefficients used in the calculation of a weighting summation average value can be set in accordance with a degree of reliability of each sensing result. For example, it can be set in accordance with; distance of a terminal station from the base station, degree of a terminal station class, magnitudes of a received signal power value and a received signal power ratio, and magnitude of the time interval from the last execution of sensing.

In this case, a function to calculate the weighting summation average values of received signal power values and received signal power ratios, all of which are outputted from the demodulation/decoding unit 503, can be additionally provided at the preceding stage of each of the signal power value judgment unit 507 and the signal power ratio judgment unit 508. Using the respective calculated weighting summation average values, the signal power value judgment unit 507 and the signal power ratio judgment unit 508 perform a comparison with a threshold value The signal power ratio threshold value calculation unit 509 calculates a signal power ratio threshold value. Here, the following description will be given, taking as an example the case where a signal power ratio threshold value is determined with respect to the frequency band f1 (the frequency band which is assigned to or of which a preferential use is permitted to the base station 101 of the other radio system 11).

Figure 7:
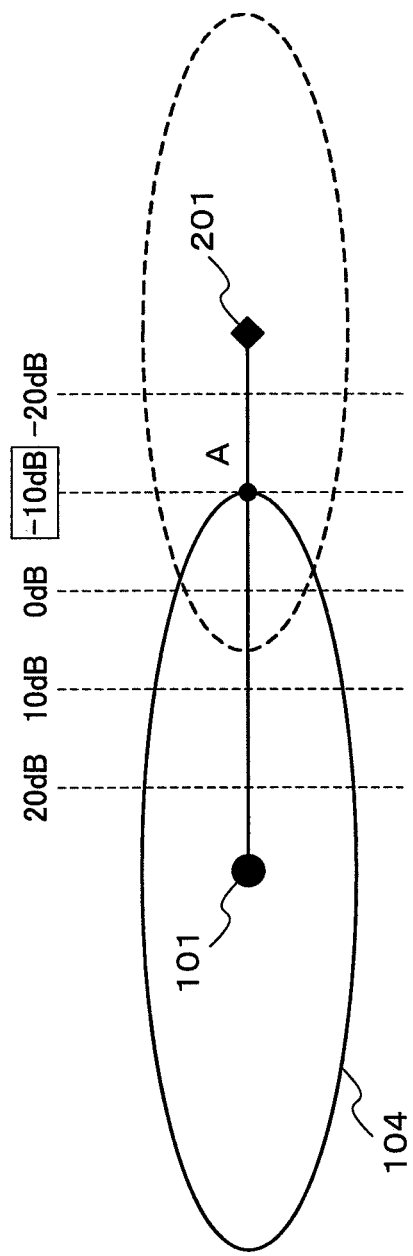
FIG. 7 a conceptual diagram showing a method of setting a signal power ratio threshold value.

FIG. 7 is a conceptual diagram showing a setting method of a signal power ratio threshold value. In an area 104 where received signal power values are equal to or larger than a predetermined threshold value, a received signal power ratio (−10 dB) at a point A (here, it is the spot closest to the area 104 from the base station 201), where a received signal power value is smallest, is set as a signal power ratio threshold value. A received signal power ratio between a base station of the other radio system 11 and the base station 201 of the own radio system 12 is calculated by the following equation, for example.

Received signal power ratio=(received signal power value of the base station 101)/(received signal power value of the base station 201)

Here, a received signal power value of each base station is calculated by the following equation, for example, using a transmission power value of each base station, propagation loss and an antenna gain of each transmitter-receiver station.

Received signal power value of each base station=transmission power value−propagation loss+antenna gain Further, the propagation loss is calculated by a propagation loss calculation formula such as shown by the following equation, for example, using a distance between each transmitter-receiver station which can be obtained from a position of each base station and a position of each receiver station, a carrier-wave frequency of each base station, and an antenna height of each transmitter-receiver station.

$$\text{Propagation loss} = 69.55 + 26.16 \times \log10(f) - 13.82 \times \log10(hb) - \{(1.11 \times \log10(f) - 0.7) \times hm - (1.56 \times \log10(f) - 0.8)\} + (44.9 - 6.55 \times \log10(hb)) \times \log10(d)$$

where, f represents a carrier-wave frequency (MHz), hm an antenna height of a transmitter station (m), and hb an antenna height of a receiver station (m), and d a propagation distance (m) (a distance between each transmitter-receiver station which can be obtained from a position of each base station and a position of each receiver station). Here, the antenna height of a receiver station is defined to be an assumed receiving antenna height at the spot of calculation. As the propagation loss calculation formula, an optimum calculation formula is employed considering the used frequency and area (the urban area or the suburbs) and the like. Further, as the antenna gains, values for respective radio systems may be employed, and also an identical value may be employed assuming that they are the same for all the radio systems.

Further, description will be given of the case where a received signal power ratio is calculated as (received signal power value of the base station 201)/(received signal power value of the base station 101), that is, the case where the denominator and the numerator are interchanged compared to the above-described case. In this case, as the signal power ratio threshold value, is set a maximum received signal power ratio between the base station 101 and the base station 201 in the area where received signal power values of the base station 101 of the other radio system 11 are equal to or larger than a predetermined signal power threshold value.

The comprehensive judgment unit 510 judges comprehensively a utilization status of the other radio system 11 in terms of a frequency band targeted for use, using judgment results outputted from the signal power value judgment unit 507 and the signal power ratio judgment unit 508.

FIG. 8 is a table showing an example of a judgment result of the comprehensive judgment unit 510. For example, when a received signal power value and a received signal power ratio are both smaller than respective threshold values, the comprehensive judgment unit 510 judges that the frequency band targeted for use is not used by the other radio system 11. On the other hand, for example, when at least either of a received signal power value and a received signal power ratio is not smaller than a corresponding threshold value, the comprehensive judgment unit 510 judges that the frequency band targeted for use is used by the other radio system 11. Of course, the method of judgment at the comprehensive judgment unit 510 is not limited to the above-mentioned one, and another judgment method can be adopted.

Here, when sensing results from a plurality of terminal stations can be obtained, the utilization status estimation unit 504 can perform a final estimation of a utilization status using the estimation results of a utilization status based on the sensing results obtained at the respective terminal stations. Specifically, using the judgment results based on the sensing results obtained at the respective terminal stations, when the number of the terminal stations judging that a signal is detected is equal to or larger than a predetermined specific number-judgment threshold value THn, the comprehensive judgment unit 510 finally judges that a signal is detected. On the other hand, when the number is smaller than the number-judgment threshold value THn, the comprehensive judgment unit 510 finally judges that a signal is not detected.

Further, the above description of the second illustrative embodiment has been given taking as an example the case, where received signal power ratios between a base station of the other radio system 11 and the base station of the own radio system 12 is calculated at the terminal stations, but it is not the only case. For example, each terminal station calculates received signal power values of a base station of the other radio system 11 and of the own radio system 12, and transmit them to the base station 201 of the own radio system 12. Then, using the received signal power values, the base station 201 may calculate received signal power ratios. In this case, in the terminal stations, the power ratio calculation unit 412-1 to 412-n of the sensing unit 403 are unnecessary. On the other hand, it is only necessary that the base station is additionally provided with a function to calculate a received signal power ratio from the received signal power values of the base stations of the other radio system 11 and that of the own radio system 12, at the preceding stage of the signal power ratio judgment unit 508.

Figure 9:
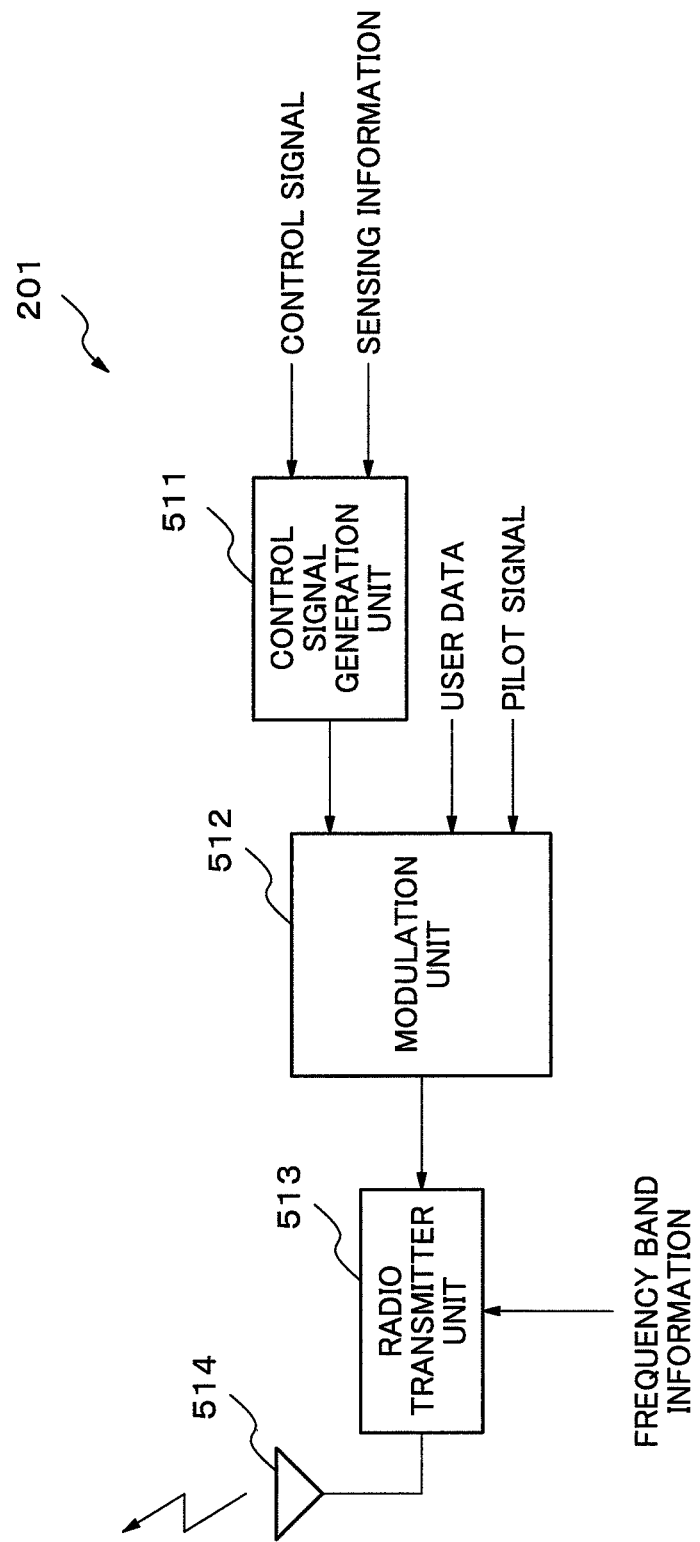
FIG. 9 a block diagram showing an illustrative configuration of a base station (its transmission part) of the own radio system shown in FIG. 2.

FIG. 9 is a block diagram showing an illustrative configuration of the base station 201 (its transmission part) of the own radio system 12 shown in FIG. 2. The base station 201 (its transmission part) comprises a control signal generation unit 511, a modulation unit 512, a radio transmitter unit 513 and a transmission antenna 514.

At the control signal generation unit 511, for communication or broadcasting, control signals sent from a control unit of an upper layer (not shown in the figures) and from the radio resources management unit 550 and sensing information are inputted, and control signals adapted to a format for communication are outputted. Here, the sensing information is instruction information relevant to the sensing (information on terminal stations which perform the sensing, information on a frequency to be sensed, information on timing and interval of the sensing and the like). At the modulation unit 512, the control signals outputted from the control signal generation unit 511 are inputted along with user data and a pilot signal sent from the control unit of an upper layer, and these signals experience processes such as of coding, interleaving, modulation and mapping, and are then outputted to the radio transmitter unit 513. At the radio transmitter unit 513, information on a frequency band to be used for communication or broadcasting is inputted, and processes such as of D/A conversion, up conversion and transmission power amplification are performed in accordance with a frequency band to use. The radio transmitter unit 513 transmits the signals having undergone the processes to the terminal stations 301 and 302 via the transmission antenna 514.

Figure 10:
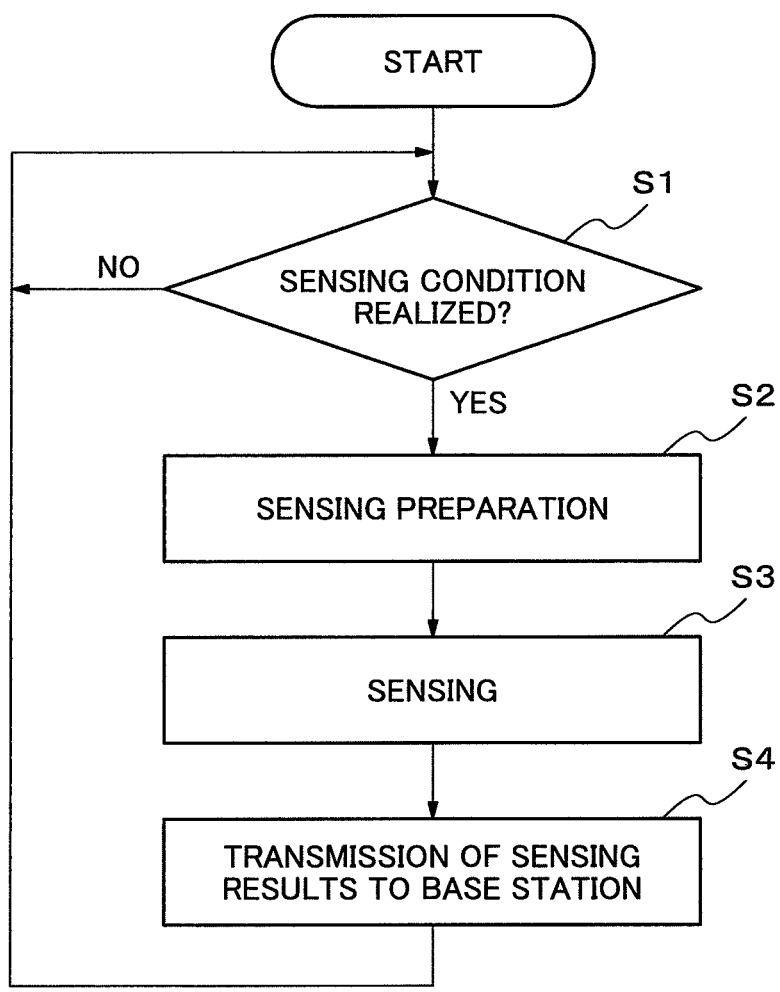
FIG. 10 a flow chart for illustrating an example of operation of a terminal station performing sensing.

FIG. 10 is a flow chart for illustrating an example of operation of a terminal station which performs sensing.

Here, the terminal station which performs this example of operation is a terminal station which has received designation of sensing. For example, it is assumed that the designation of sensing has been made in advance from the base station 201. In the following, description will be given assuming that, for example, the terminal stations 301 and 302 have received the designation of sensing.

First, the terminal stations 301 and 302 determine whether a sensing condition is realized or not (Step S1). Here, as an example of sensing condition realization, there can be mentioned the case where a sensing time set in advance by the base station 201 and the like has come.

When the sensing condition is realized, the terminal stations 301 and 302 prepares for the sensing (Step S2). Specifically, the terminal stations 301 and 302 connect the transmission-receiving antenna 401 with the sensing unit 403 by operating the switch 402. The terminal stations 301 and 302 execute the sensing (Step S3). Specifically, from signals received from the base stations 101-103 of the other radio system 11, the sensing unit 403 calculates received signal power values in the respective frequency bands used by the base stations. Further, the sensing unit 403 calculates a ratio between a power value of a signal received from each of the base stations 101-103 of the other radio system 11 and that of a signal received from the base station 201 of the own radio system 12 (received signal power ratio). The sensing unit 403 transmits these received signal power values and received signal power ratios, as sensing results, to the base station 201 of the own radio system 12 (Step S4).

Figure 11:
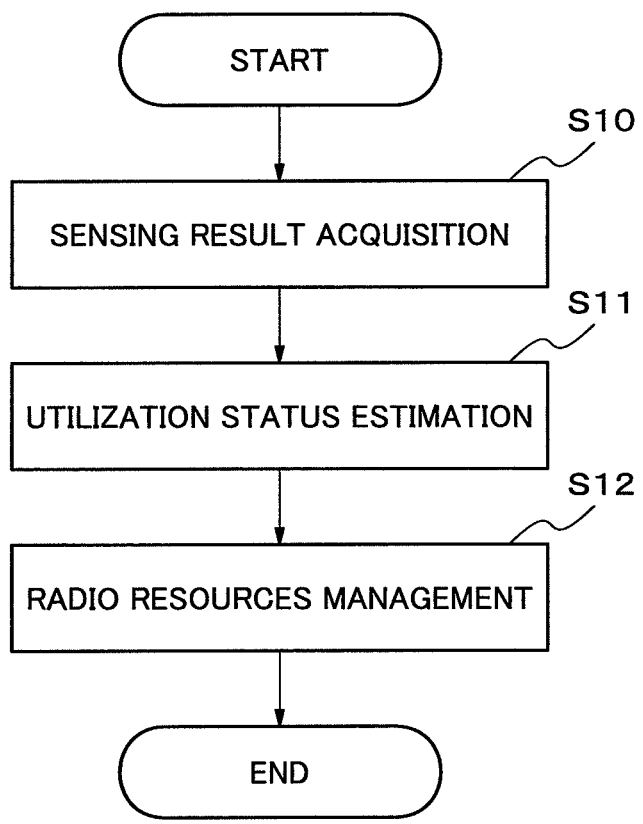
FIG. 11 a flow chart for illustrating an example of operation of a base station of the own radio system.

FIG. 11 is a flow chart for illustrating an example of operation of the base station 201 of the own radio system 12. The utilization status estimation unit 504 acquires sensing results (received signal power values and received signal power ratios) from the terminal stations 301 and 302 (Step S10). Further, the utilization status estimation unit 504 acquires information on a signal power threshold value and that on a signal power ratio threshold value externally. On the basis of the information, the utilization status estimation unit 504 estimates a utilization status of each of the frequency bands the other radio system 11 is using (Step S11). For example, the utilization status estimation unit 504 can derive a judgment result shown in FIG. 8. The utilization status estimation unit 504 outputs the judgment result as a "utilization status estimation result". On the basis of the "utilization status estimation result", the radio resources management unit 550 performs management of radio resources to be used for communication or broadcasting between the base station 201 and the terminal stations 301 and 302. As the management of radio resources, there can be mentioned, for example, selection of a frequency band to use, transmission power control, or management of communication method/modulation method/coding rate and the like.

According to the second illustrative embodiment described above, it is possible to estimate whether or not a frequency band which is assigned to or of which a preferential use is permitted to the other radio system 11 is currently used.

Here, for example, when terminal stations performing the sensing (for example, the terminal station 301 and 302) are present indoors, a radio wave from a base station of the other radio system 11 is attenuated by the influence of a building penetration loss. Accordingly, received signal power values at the terminal stations are decreased. When the received signal power values thus become equal to or smaller than a threshold value, despite the fact that the frequency band subjected to the sensing is actually in use, it is regarded as an empty frequency band. On the other hand, in the case of a received signal power ratio, since it is a ratio between the radio waves both attenuated, the value (ratio) is not affected by the building penetration loss. Therefore, in the case of the second illustrative embodiment described above, it becomes possible to estimate a utilization status of a frequency band with high accuracy, regardless of a location status of the terminal stations performing the sensing (for example, whether outdoors or indoors).

Further, by adequately managing the radio resources to use for communication or broadcasting in the own radio system 12 on the basis of the estimation result, it is possible to use efficiently a frequency band which is assigned to or of which a preferential use is permitted to the other radio system 11. Here, when a frequency band is divided into a plurality of bands, the estimation is performed on each of the divided frequency bands.

Further, in the second illustrative embodiment described above, the sensing unit 403 in the terminal station may calculate only a received signal power ratio between each base station of the other radio system 11 and the base station of the own radio system 12. That is, in this case, the terminal station calculates a received signal power ratio from a received signal power values of each base station of the other radio system 11 and a received signal power value of the base station of the own radio system 12 and transmits the calculation results, as sensing results, to the base station 201. In this case, in the sensing unit 403 (refer to FIG. 4) of the terminal station, the power value calculation unit 411-1 to 411-$n$ may be determined as unnecessary.

Corresponding to the above-described situation, at the base station 201, the utilization status estimation unit 504 estimates a utilization status of the other radio system 11 using only the received signal power ratios transmitted from the terminal stations. There, when an inputted received signal power ratio is equal to or larger than a signal power ratio threshold value, the utilization status estimation unit 504 estimates that the frequency band targeted for use is used by the other radio system 11, and on the other hand, when smaller than the threshold value, it estimates that the frequency band is not used by the other radio system 11. In this case, in the utilization status estimation unit 504 of the base station 201 (refer to FIG. 6), the signal power value judgment unit 507 and the comprehensive judgment unit 510 may be determined as unnecessary. It is because a judgment result itself of the signal power ratio judgment unit 508 becomes an estimation result of the utilization status estimation unit 504.

Further, in the second illustrative embodiment described above, the comprehensive judgment unit 510 may determine whether to use a result of the signal power ratio judgment unit 508 or not, on the basis of a judgment result of the signal power value judgment unit 507. Specifically, only when a received signal power value is determined by the signal power value judgment unit 507 as smaller than a signal power threshold value, the comprehensive judgment unit 510 uses a result of the signal power ratio judgment unit 508 to judge a utilization status of the frequency band. Here, when the received signal power ratio is equal to or larger than a signal power ratio threshold value, the comprehensive judgment unit 510 judges that the frequency band targeted for use is used by the other radio system 11, and on the other hand, when smaller than the threshold value, it judges that the frequency band is not used by the other radio system 11.

Figure 12:
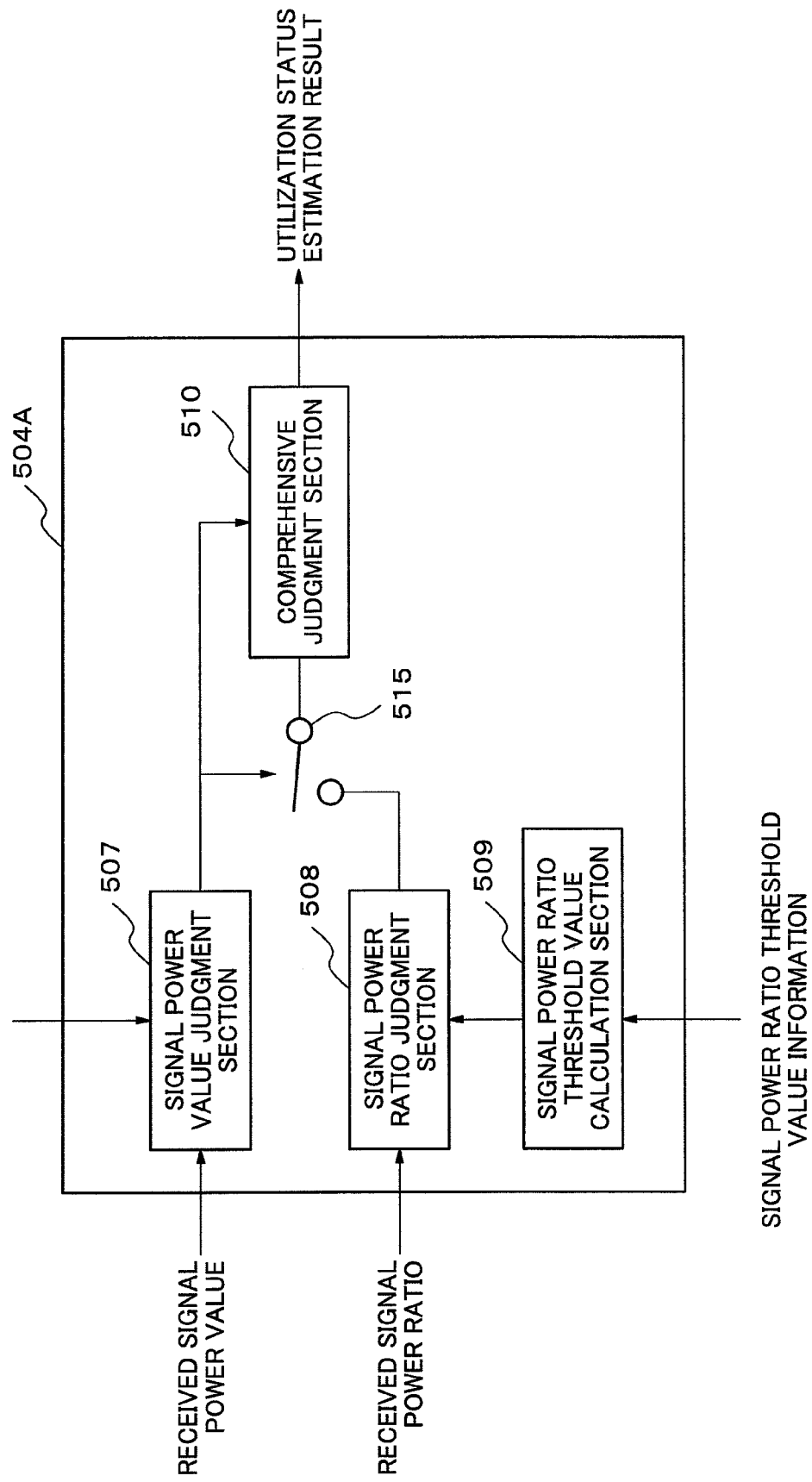
FIG. 12 a block diagram showing an illustrative configuration of a utilization status estimation unit, which is different from that shown in FIG. 5 and is a utilization status estimation unit determining whether to use or not a result of a signal power ratio judgment unit based on a judgment result of a signal power value judgment unit.

FIG. 12 is a block diagram showing an illustrative configuration of a utilization status estimation unit 504A which determines whether to use a result of the signal power ratio judgment unit 508 or not, on the basis of a judgment result of the signal power value judgment unit 507. The utilization status estimation unit 504A further comprises a switch 515 in addition to the configuration of the utilization status estimation unit 504 shown in FIG. 6. When a received signal power value is smaller than a signal power threshold value in a judgment result outputted from the signal power value judgment unit 507, the switch 515 is connected to the side of the signal power ratio judgment unit 508 so as to input the output of the signal power ratio judgment unit 508 to the comprehensive judgment unit 510. On the other hand, when the received signal power value is equal to or larger than the signal power threshold value, the output of the signal power ratio judgment unit 508 is not inputted to the comprehensive judgment unit 510. The comprehensive judgment unit 510 performs judgment of a utilization status using only the output of the signal power value judgment unit 507. That is, in this case, since the received signal power value is equal to or larger than the signal power threshold value, the comprehensive judgment unit 510 determines that the frequency band targeted for use is used by the other radio system 11.

Description will be given of an advantage of when judgment is performed also on a received signal power value by a signal power threshold value is performed. For example, when a terminal station of the own radio system performing a sensing operation can detect even a low-level signal with high accuracy, sensing of the other radio system 11 can be performed with higher accuracy than when judgment operation is performed only on a received signal power ratio by a signal power ratio threshold value.

Further, with respect to the above-described second illustrative embodiment, it has been described that received signal power values and received signal power ratios are calculated at the terminal stations and are transmitted to the base station, and then by comparing each of the values with a threshold value, a utilization status is estimated at the base station. However, the configuration is not limited to the above-described one. For example, also possible is a configuration where the processes until that of comparing received signal power values and received signal power ratios with respective threshold values are performed at the terminal stations, and the comparison results are transmitted as sensing results to the base station.

Figure 13:
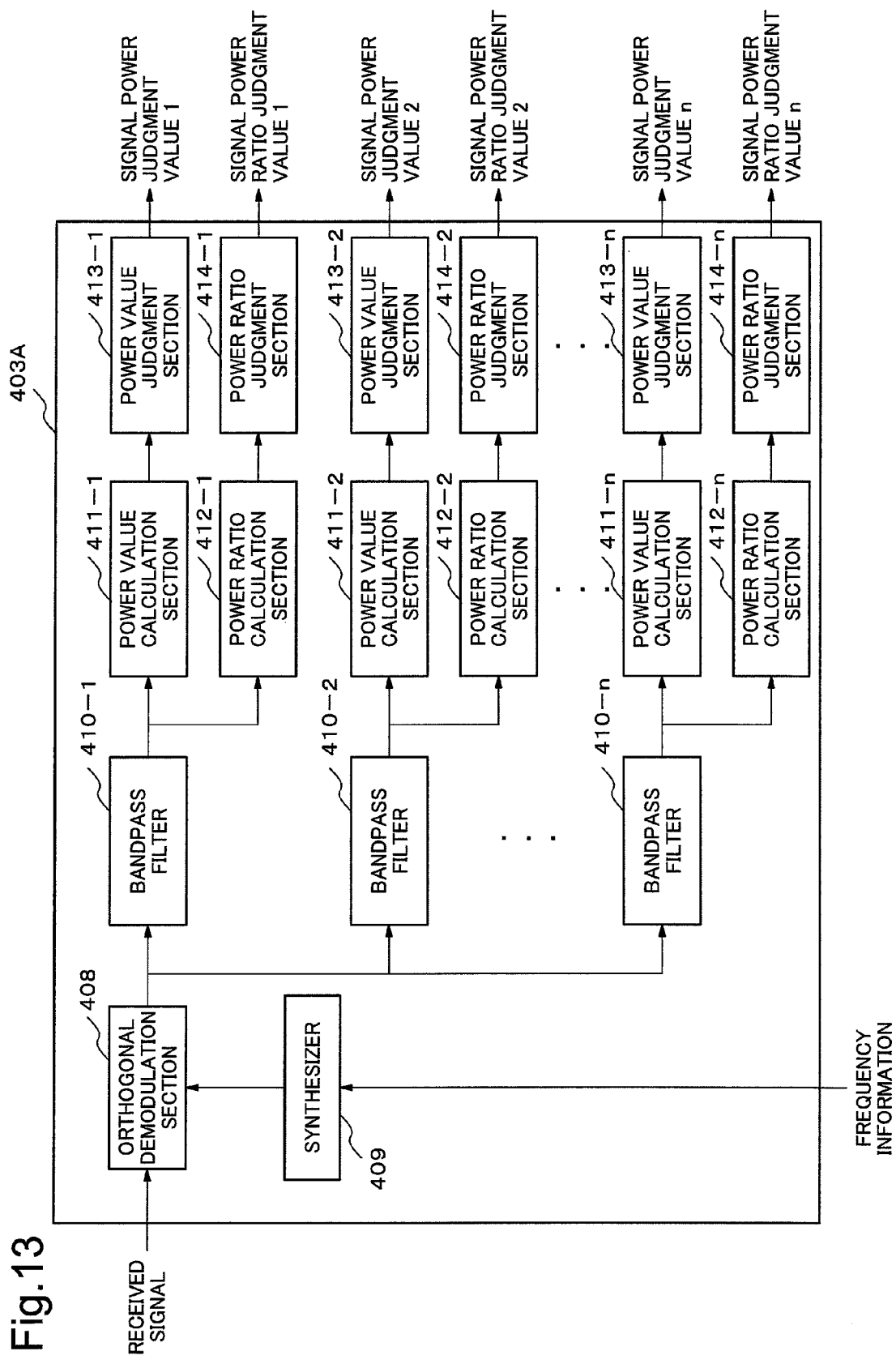
FIG. 13 a block diagram showing an illustrative configuration of a sensing unit, which is different from that shown in FIG. 4 and is a sensing unit employed in the case where processes until comparison of a received signal power value and a received signal power ratio with respective threshold values is performed at a terminal station, and the comparison results are sent to a base station as sensing results.

FIG. 13 is a block diagram showing an illustrative configuration of a sensing unit 403A in the case where the processes until that of comparing received signal power values and received signal power ratios with respective threshold values are performed at the terminal stations, and the comparison results are transmitted as sensing results to the base station.

The sensing unit 403A further comprises power value judgment units 413-1 to 413-n and power ratio judgment units 414-1 to 414-n in addition to the configuration of the sensing unit 403 shown in FIG. 4. Their output signals are transmitted to the base station 201, as signal power judgment value 1 to signal power judgment value n and signal power ratio judgment value 1 to signal power ratio judgment value n, respectively.

In this case, the configuration of the utilization status estimation unit 504 of the base station 201 becomes that obtained by removing the signal power value judgment unit 507, the signal power ratio judgment unit 508 and the signal power ratio threshold value calculation unit 509 from the configuration in FIG. 6. The sensing results transmitted from the terminal stations (in this case, signal power judgment value 1 to signal power judgment value n and signal power ratio judgment value 1 to signal power ratio judgment value n) are inputted directly to the comprehensive judgment unit 510.

In this case, a signal power threshold value and a signal power ratio threshold value, which are used for the judgment at the terminal stations, need to be informed to the terminal stations from the base station 201. Therefore, the base station 201 calculates and sets respective threshold values, and informs them to the terminal stations as a piece of information included in the sensing information or via an information channel.

With respect to the second illustrative embodiment described above, it has been described that estimation of a utilization status of a frequency band is performed at the base station 201. However, the estimation of a utilization status may be performed in the terminal stations. Specifically, it is also possible for the terminal stations to comprise a configuration equivalent to the utilization status estimation unit 504 of the base station 201, estimate whether or not a frequency band targeted for use is used by the other radio system 11, and inform the estimation result to the base station 201. In this case, it would not be necessary to say that the terminal stations can be equipped with also the signal power ratio threshold value calculation unit 509 constituting the utilization status estimation unit 504. In such a situation, the utilization status estimation unit 504 of the base station 201 becomes unnecessary, and the radio resources management unit 550 acquires results of utilization status estimation directly from the demodulation/decoding unit 503.

With respect to the above-described second illustrative embodiment, description has been given focusing on the processes at the base stations 101 and 201, but it would not be necessary to say that the similar processes can be performed also at the base stations 102 and 103. Further, when the number of base stations existing in an other radio system 11 is equal to or smaller than two, or equal to or larger than four (that is, when a frequency band is divided into a plurality of bands), a utilization status can be estimated on each of the plurality of frequency bands, by performing the above-described processes with respect to each of the above-described base stations. In another case where a plurality of other radio systems 11 each including at least one base station exist, a utilization status can be estimated on each frequency band, by performing the above-described processes with respect to each of the radio systems.

Further, an ad hoc-like configuration is possible where a certain terminal station, in place of the base station, performs the estimation of a utilization status of a frequency band targeted for use, collecting sensing results at the other terminal stations. Here, although it could be assumed that a relay station exists between the base station and the terminal stations, such a relay station can be regarded as a kind of terminal station connected to the base station or as a kind of base station to which the terminal stations are connected. Accordingly, not excluded is the case where the estimation of a utilization status of a frequency band targeted for use is performed at a relay station.

With respect to the above-described second illustrative embodiment, description has been given taking as an example the case where a specific frequency band (frequency band F) is assigned to or its preferential use is permitted to the own radio system 12. However, even when a specific frequency band is not either assigned or preferentially permitted to the own radio system 12, the present illustrative embodiment is applicable in such a way that a received signal power value is calculated using a known signal of each radio system and the like, after starting a secondary use of a frequency band which is not used by the other radio system 11.

Further, when a plurality of terminal stations constitute an ad hoc-like network, it is also possible that a predetermined terminal station (for example, the terminal station which estimates a utilization status of a frequency band targeted for use) performs radio resources management, without transmitting sensing results to the base station, and communication or broadcasting is performed between the plurality of terminal stations. In this case, the predetermined terminal station comprises a radio resources management unit. The radio resources management unit used in this case can be an identical one with the radio resources management unit 550 shown in FIG. 5. This radio resources management unit performs radio resources management on the basis of a "utilization status estimation result" which is received from its own or the other terminal stations, or from the base station 201.

In terminal stations 301 and 302, the transmission-receiving antenna 401 may have a configuration where it is separated into a receiving antenna and a transmission antenna.

Further, in the base station 201, the radio wave detection antenna 505 and the receiving antenna 501 may be combined into one common antenna. In this case, the common antenna can be used in a time division manner in accordance with a purpose of the use (for example, receiving at the time of sensing or that at normal state). Further, the radio wave detection antenna 505, the receiving antenna 501 and the transmission antenna 514 may be combined into one common antenna. In this case, the common antenna can be used in a time division manner in accordance with a purpose of the use (for example, receiving for sensing, normal receiving or normal transmission).

As an example of radio resources management, the radio resources management unit 550 can perform "management of communication method/modulation method/coding rate and the like". Specifically, the radio resources management unit 550 can select a communication method/modulation method/coding rate and the like, according to a geographical utilization status of a frequency band of the other radio system 11, and the distances between the base station 201 and the terminal stations of the own radio system 12. For example, when the distances are small, the radio resources management unit 550 can assign OFDM for a communication method, 64QAM for a modulation method, and 7/8 as a coding rate. Here, OFDM and QAM are acronyms of Orthogonal Frequency Division Multiplexing and Quadrature Amplitude Modulation, respectively. On the other hand, when the distances are large, the radio resources management unit 550 can assign DFT-s-OFDM for a communication method, QPSK for a modulation method, and 1/12 as a coding rate. Here, DFT-s-OFDM and QPSK are acronyms of Discrete Fourier Transform-spread-OFDM and Quadrature Phase Shift Keying, respectively. Further, the communication method/modulation method/coding rate also can be set according to a plurality of distance levels.

The Third Illustrative Embodiment

The present embodiment is characterized in that a signal power ratio threshold value is updated on the basis of received signal power ratios calculated at the terminal stations.

Similarly to the second illustrative embodiment, the terminal stations performing sensing calculate received signal power values of the base stations of the other radio system 11, and a received signal power ratio between each base station of the other radio system 11 and the base station 201 of the own radio system 12, and transmit them as sensing results to the base station 201. Using the sensing results sent from the terminal stations (received signal power values and received signal power ratios), also similarly to the second illustrative embodiment, the base station 201 estimates whether or not the other radio system 11 is using a frequency band targeted for use. In the case of the present illustrative embodiment, a further characteristic point is that a signal power ratio threshold value is updated.

When the threshold value is set by means of the method of calculating a signal power ratio threshold value which has been described with respect to the second illustrative embodiment, since received signal power values are calculated without taking into account geographical conditions such as landscapes and buildings, errors may arise between actual received signal power values and the calculated values.

Accordingly, in the present illustrative embodiment, by using received signal power values and received signal power ratios which are calculated as sensing results at the terminal stations, a signal power ratio threshold value based on actual propagation environment is set.

Specifically, from among the received signal power ratios which are calculated at a plurality of terminal stations where received signal power values are equal to or larger than a signal power ratio threshold value, the smallest value of received signal power ratio is set as a signal power ratio threshold value.

By using this method, it becomes possible to set a more adequate signal power ratio threshold value which is in accordance with actual propagation environment, and accordingly to estimate more precisely whether or not the other radio system is using a frequency band targeted for use.

Figure 14:
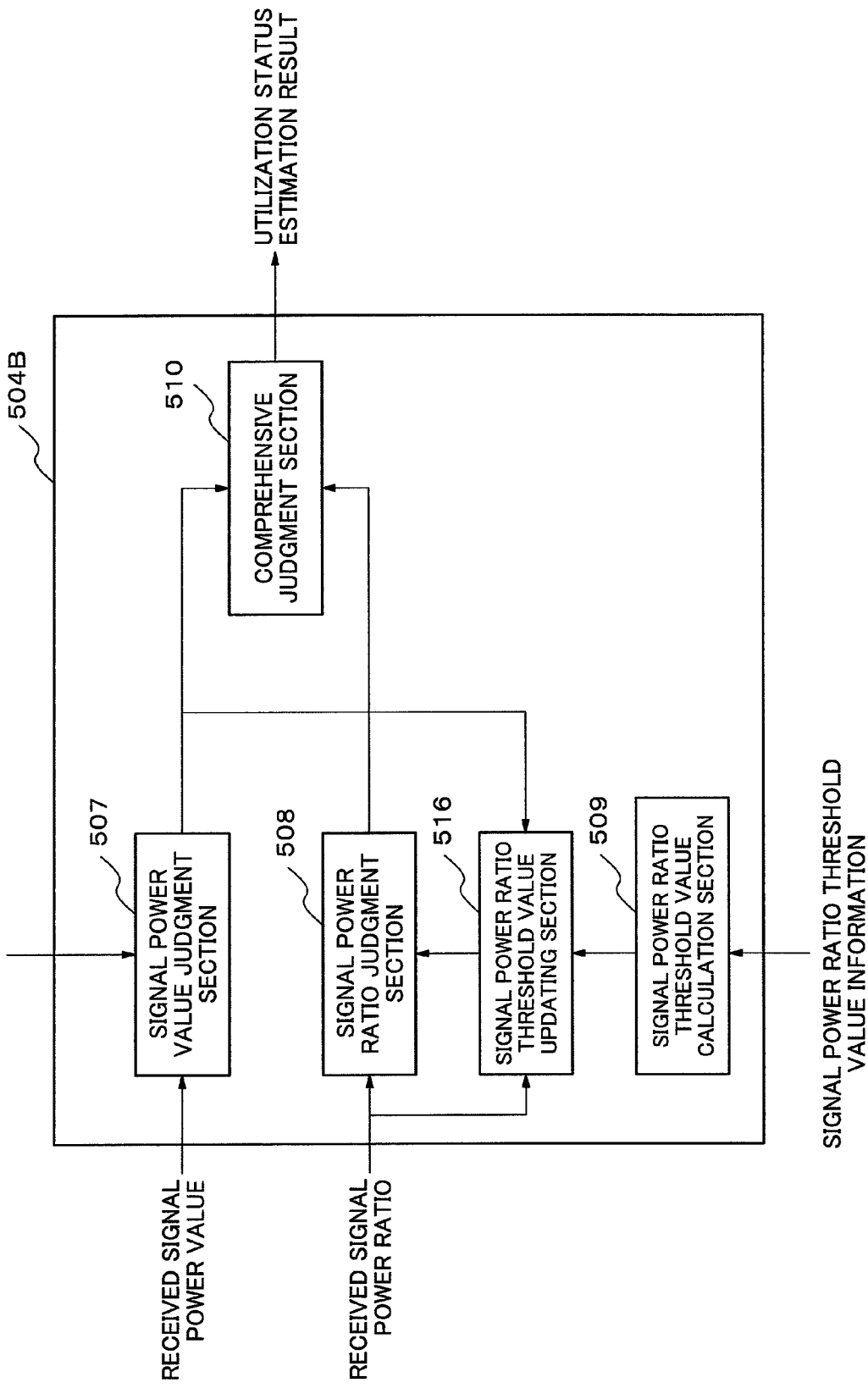
FIG. 14 a block diagram showing an example of a utilization status estimation unit constituting a base station of the third illustrative embodiment according to the present invention.

FIG. 14 is a block diagram showing an example of a utilization status estimation unit 504B constituting the base station of the third illustrative embodiment according to the present invention. The utilization status estimation unit 504B further comprises a signal power ratio threshold value updating unit 516 (means for updating a threshold value) in addition to the configuration of the utilization status estimation unit 504 shown in FIG. 6. As the rest of the portions of the configuration are the same as that of the second illustrative embodiment described before, the identical codes are given to them without giving description, and description is given here only of the portions of the configuration and their operation which are different from the second illustrative embodiment.

Figure 15:
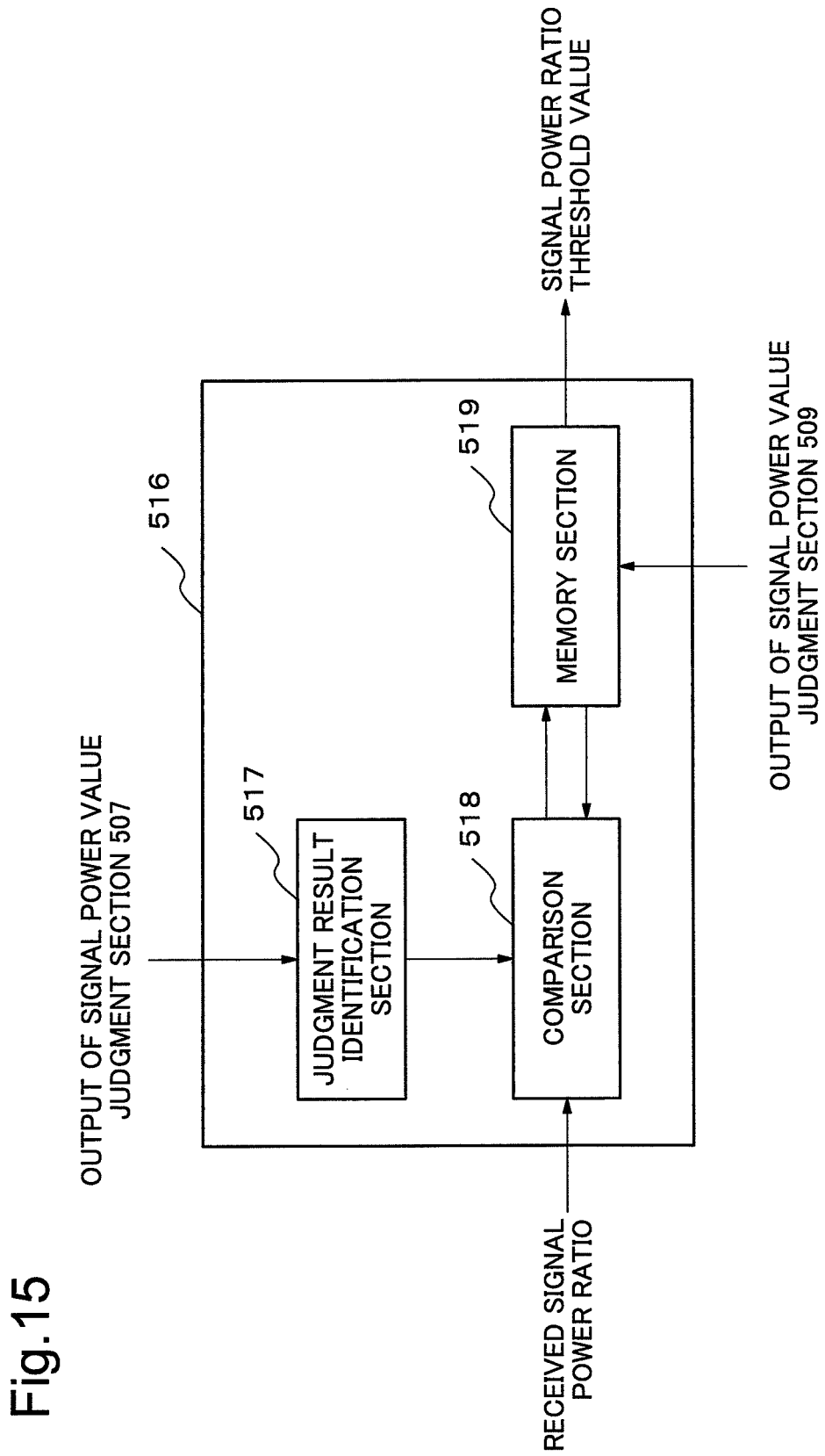
FIG. 15 a block diagram showing an illustrative configuration of a signal power ratio threshold value updating unit constituting a utilization status estimation unit shown in FIG. 14.

FIG. 15 is a block diagram showing an illustrative configuration of the signal power ratio threshold value updating unit 516 which constitutes the utilization status estimation unit 504B shown in FIG. 14. The signal power ratio threshold value updating unit 516 comprises a judgment result identification unit 517, a comparison unit 518 and a memory unit 519.

The judgment result identification unit 517 identifies, in the output from the signal power value judgment unit 507, whether or not a received signal power value is equal to or larger than a signal power threshold value. When it is equal to or larger than the threshold value, the comparison unit 518 compares the corresponding received signal power ratio sent from the terminal stations and the present signal power ratio threshold value stored in the memory unit 519. When the comparison result shows that the received signal power ratio is smaller than the present signal power ratio threshold value, the comparison unit 518 stores the value of this received signal power ratio in a memory unit 519 as a new signal power ratio threshold value. At the memory unit 519, an initial threshold value is set at the output of the signal power ratio threshold value calculation unit 509, and when a new threshold value is set as a result of the comparison at the comparison unit 518, the threshold value is stored and also is outputted to the signal power ratio judgment unit 508 as a signal power ratio threshold value.

As has been described above, in the case of the third illustrative embodiment, since the signal power ratio threshold value is updated based on the received signal power ratios calculated at the terminal stations, it becomes possible to set a more adequate signal power ratio threshold value which is in accordance with actual propagation environment, and accordingly to estimate a utilization status of the other radio system more precisely.

With respect to the above-described third illustrative embodiment, since description has been given of the case where a received signal power ratio between the base station 101 and the base station 201 is calculated by (received signal power value of the base station 101)/(received signal power value of the base station 201), a received signal power ratio used for updating was set to be the smallest value among the received signal power ratios obtained at a plurality of terminal stations. However, when a received signal power ratio between the base station 101 and the base station 201 is calculated by (received signal power value of the base station 201)/(received signal power value of the base station 101), a received signal power ratio used for updating is set, contrary to the above-described case, to be the largest value among the received signal power ratios obtained at a plurality of terminal stations.

Further, the above description of the third illustrative embodiment has been given taking as an example the case where updating of a signal power ratio threshold value is performed at the base station, but it is not the only case. For example, it is possible to have an ad hoc-like configuration where, in place of the base station, a certain terminal station collects sensing results at the other terminal stations and performs the updating of a signal power ratio threshold value. In this case, the terminal station can be equipped with a configuration which is equivalent to the signal power ratio threshold value updating unit 516. Here, although it could be assumed that a relay station exists between the base station and the terminal stations, such a relay station can be regarded as a kind of terminal station connected to the base station or as a kind of base station to which the terminal stations are connected, and therefore the case where updating of a signal power ratio threshold value is performed at a relay station is not excluded.

The Fourth Illustrative Embodiment

In the present embodiment, for example, the base station of the own radio system 12 estimates an area where the other radio system 11 is using a frequency band targeted for use, using sensing results at the terminal stations performing sensing and position information of the terminal stations. In the above description, the sensing results are, for example, ratios between respective power values of signals received from the base stations of the other radio system 11 and a power value of a signal received from the base station of the own radio system 12, which are obtained at the terminal stations. On the basis of the estimation result, for example, by adequately performing radio resources management in terms of communication or broadcasting, the base station of the own radio system 12 uses a frequency band which is assigned to or of which a preferential use is permitted to the other radio system 11.

Figure 16:
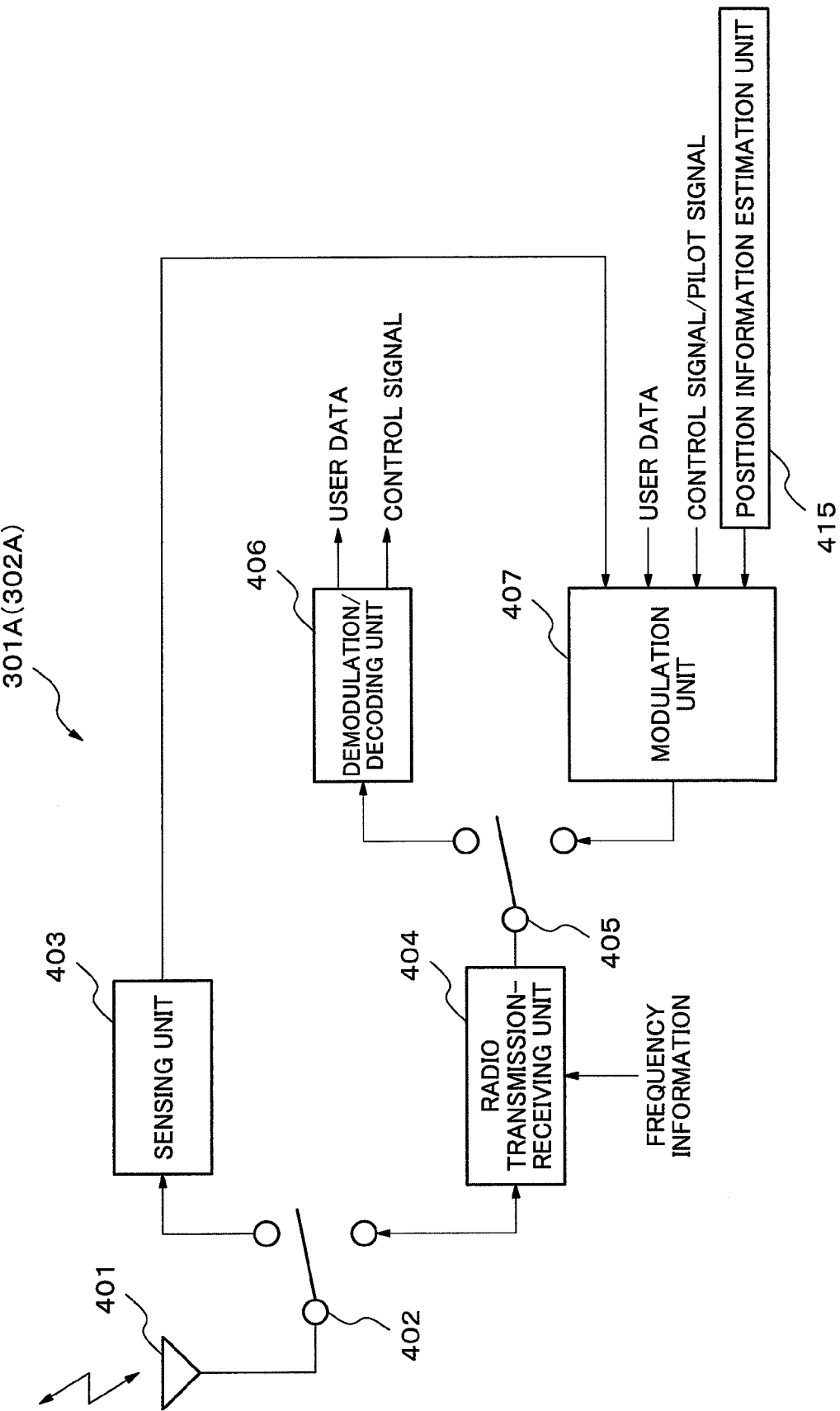
FIG. 16 a block diagram showing an illustrative configuration of a terminal station constituting a radio system of the fourth illustrative embodiment according to the present invention.

FIG. 16 is a block diagram showing an illustrative configuration of terminal stations 301A and 302A which perform sensing operation in a radio system according to the fourth illustrative embodiment of the present invention. The terminal stations 301A and 302A comprise a position information estimation unit 415 in addition to the configuration in FIG. 3. As the rest of the portions of the configuration are the same as that in FIG. 3, the identical codes are given to them without giving description.

The position information estimation unit 415 acquires position information (information on latitude and longitude) of its own terminal station, for example, from GPS (Global Positioning System). Here, a means for position estimation employed in the position information estimation unit 415 is not limited to GPS. For example, a position estimation system other than GPS can be used. Alternatively, it is possible to adopt a method where the terminal stations 301A and 302A themselves estimate their own positions using received signals from a plurality of base stations.

Position information of the own terminal station outputted from the position information estimation unit 415 is inputted to the modulation unit 407. On sensing results, user data, a control signal and a pilot signal, and position information of the own terminal station, the modulation unit 407 performs processes such as of coding, interleaving, modulation and mapping, and outputs the resultant signals to the switch 405. On the signals from the switch 405, the radio transmission-receiving unit 404 performs processes such as of D/A conversion, up conversion and transmission power amplification, and outputs the signals having undergone the processes to the transmission-receiving antenna 401 via the switch 402. Then, the signals having undergone the processes are transmitted from the transmission-receiving antenna 401 to the base station 201.

Figure 17:
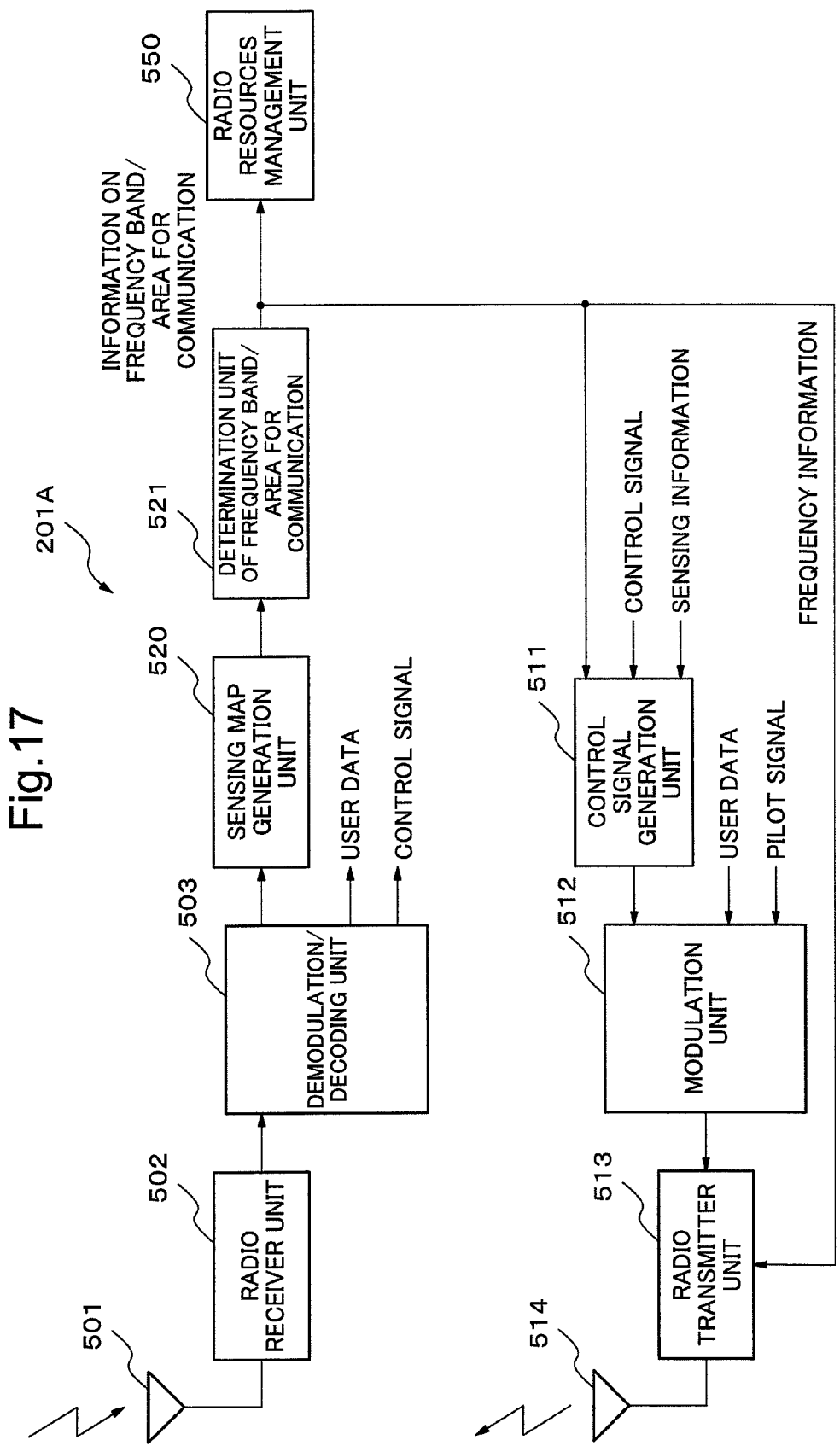
FIG. 17 a block diagram showing an illustrative configuration of a base station of the own radio system constituting a radio system of the fourth illustrative embodiment.

FIG. 17 is a block diagram showing an illustrative configuration of a base station 201A of the own radio system 12 in the radio system according to the fourth illustrative embodiment of the present invention. The base station 201A further comprises a sensing map generation unit 520 and a determination unit of frequency band/area for communication 521, in addition to the configuration of the base station 201 (its receiving part) shown in FIG. 5 and the base station 201 (its transmission part) shown in FIG. 9.

As recognized from FIG. 17, the base station 201A does not comprise the utilization status estimation unit 504, but some of its functions (the signal power ratio judgment unit 508 and the comprehensive judgment unit 510) are included, for example, in the determination unit of frequency band/area for communication 521. With respect to the present illustrative embodiment, the case where sensing is not performed at the base station 201A is taken as an example. Accordingly, the base station 201A does not comprise the radio wave detection antenna 505 and the sensing unit 506. As the rest of the portions of the configuration are the same as that in FIGS. 5 and 9, the identical codes are given to them without giving description.

The sensing map generation unit 520 creates a sensing map on the basis of sensing results (received signal power ratios) and position information received from the terminal stations 301A and 302A via the receiving antenna 501, the radio receiver unit 502 and the demodulation/decoding unit 503. The sensing map generation unit 520 outputs mapping information (may be called sensing map information) which is information resulting from the mapping, to the determination unit of frequency band/area for communication 521.

The determination unit of frequency band/area for communication 521 receives the mapping information outputted from the sensing map generation unit 520. On the basis of the mapping information, the determination unit of frequency band/area for communication 521 determines frequency bands the other radio system 11 is using (frequency bands f1-f3, in the case of the present illustrative embodiment) and areas where those frequency bands are used, and outputs them as "information on frequency band/area for communication".

Figure 19:
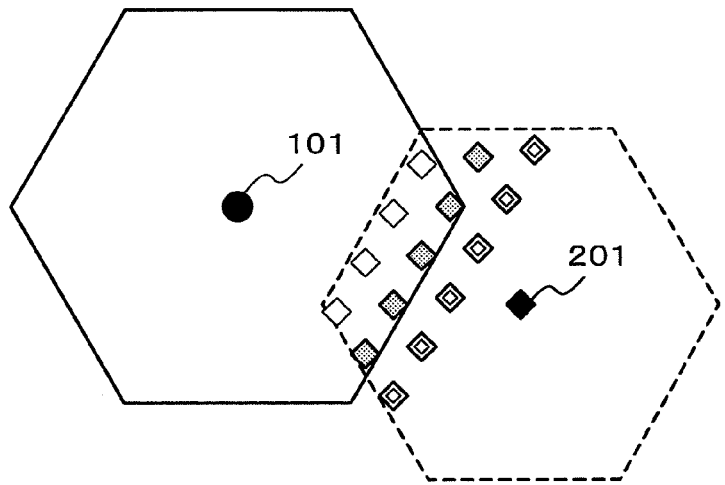
FIG. 19 an example of a sensing map generated at a base station of the own radio system in the fourth illustrative embodiment.

Here, the determination unit of frequency band/area for communication 521 displays a function which is equivalent to that of the signal power ratio judgment unit 508 (refer to FIG. 6). That is, as shown in FIG. 19, the determination unit of frequency band/area for communication 521 estimates, for example, a cover area of the base station 101 of the other radio system 11 (that is, an area where the base station 101 is using the frequency band f1 targeted for use). The "Information on frequency band/area for communication" is inputted to the radio resources management unit 550, the control signal generation unit 511 and the radio transmitter unit 513.

On the basis of the "information on frequency band/area for communication", the radio resources management unit 550 manages radio resources which are used for communication or broadcasting in the own radio system 12. As the management of radio resources, for example, selection of a frequency band to use, transmission power control, or management of communication method/modulation method/coding rate and the like can be mentioned.

To the control signal generation unit 511, inputted are the "information on frequency band/area for communication", control signals for communication which are sent from a control unit of an upper layer (not shown in the figures) or from the radio resources management unit 550, and the sensing information (described above). The control signal generation unit 511 transforms these pieces of information so as to generate control signals adapted to a communication format, and outputs the control signals to the modulation unit 512. The modulation unit 512 receives the control signals outputted from the control signal generation unit 511 and user data and pilot signals sent from a control unit of an upper layer. On these signals, the modulation unit 512 performs processes such as of coding, interleaving, modulation and mapping, and then outputs the resultant signals to the radio transmitter unit 513. The radio transmitter unit 513 receives the "information on frequency band/area for communication", and performs processes such as of D/A conversion, up conversion and transmission power amplification according to the frequency band to use, and transmits the signals having undergone the processes to the terminal stations 301A and 302A via the transmission antenna 514.

Figure 18:
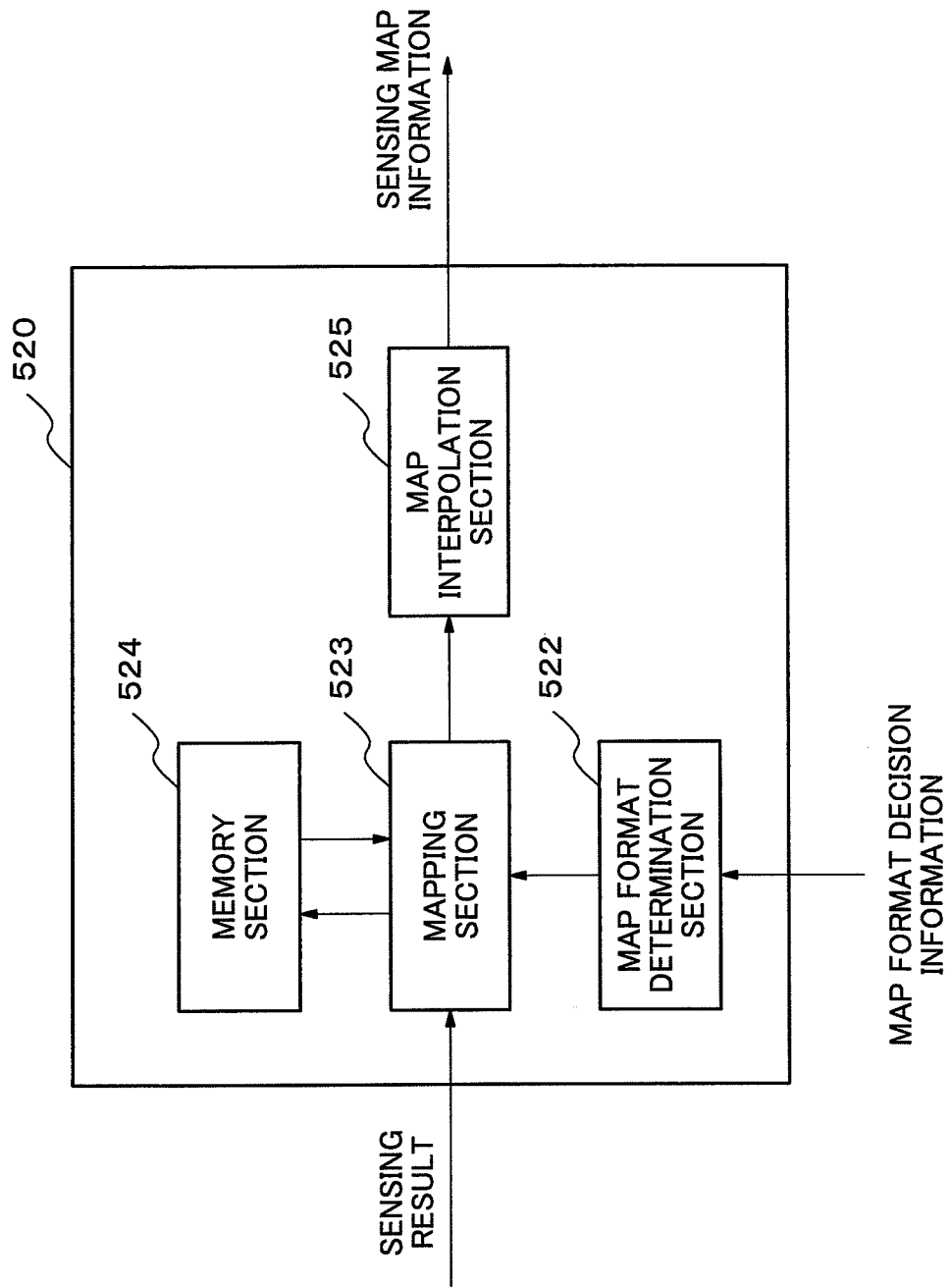
FIG. 18 a block diagram showing an illustrative configuration of a sensing map generation unit constituting a base station shown in FIG. 17.

FIG. 18 is a block diagram showing an illustrative configuration of the sensing map generation unit 520 which constitutes the base station 201A shown in FIG. 17. The sensing map generation unit 520 comprises a map format determination unit 522, a mapping unit 523, a memory unit 524 and a map interpolation unit 525.

The map format determination unit 522 determines a map format on the basis of information on map format determination which is inputted at the time such as of starting operation of the base station 201A, The information on map format determination includes, for example, a spread of an area for which a sensing map is created, a dimension of a grid with which the sensing results are mapped, or positions of the observation spots (described later) at which the sensing results are mapped and distances between the observation spots and the like. Here, when position information transmitted from a terminal station is not coincident with a position of an observation spot, for example, the map format determination unit 522 places the mapping point at an observation spot which is closest to the position where the terminal station exists.

The mapping unit 523 generates a sensing map by mapping the sensing results onto a map outputted from the map format determination unit 522. When information on sensing maps of until the latest mapping is stored in the memory unit 524, the mapping unit 523 creates a map in advance based on the information, and performs an additional mapping of newly acquired sensing results onto the map. Further, when there are a plurality of sensing results for an identical position, the mapping unit 523 may map the latest sensing result, or may map an average value of the plurality of sensing results (for example, a summation average or an weighting summation average).

The sensing map outputted from the mapping unit 523 is inputted to the map interpolation unit 525 and also is stored in the memory unit 524.

The map interpolation unit 525 performs an interpolation process on the sensing map outputted from the mapping unit 523. When the number of terminal stations performing sensing is small, only the sensing results at the spots being distant in terms of a position from each other can be obtained. As an interpolation process, the map interpolation unit 525 connects the spots of an identical received signal power value with a line, and thereby creates a sensing map. The map interpolation unit 525 outputs the sensing map having undergone the interpolation process to the determination unit of frequency band/area for communication 521 as information on a sensing map. As a method of interpolating between the spots accompanied by sensing results, in addition to the linear interpolation, any method which interpolates between a plurality of points, such as a second order interpolation, is applicable.

Here, the configuration is such that the output of the mapping unit 523 is inputted to the memory unit 524, but it may be such that the output of the map interpolation unit having undergone the interpolation process is inputted to the memory unit 524 and is stored there.

FIG. 19 is an example of a sensing map created at the base station 201A of the own radio system 12. Here, the sensing map shown in FIG. 19 is a sensing map in terms of the base station 101 of the other radio system 11. As illustrated in this sensing map, by a comparison process, the determination unit of frequency band/area for communication 521 determines an area of a value equal to or larger than the above-mentioned received signal power ratio threshold value as within the cover area of the base station 101, and does an area of a value smaller than the received signal power ratio threshold value as outside the cover area of the base station 101. The comparison process in the above description is a process of comparing a received signal power ratio at each spot with the "signal power ratio threshold value". As shown in FIG. 19, for example, predetermined signal power ratio threshold value can be set to be 5 dB, 0 dB, −5 dB or the like. These pieces of threshold value information are stored in advance in the determination unit of frequency band/area for communication 521, and are selected as necessary.

Next, operation of the terminal stations 301A and 302A will be described. The terminal stations 301A and 302A existing in the cover area of the base station 201A of the own radio system 12 perform sensing of a frequency band targeted for use, for example, based on a direction made by the base station 201A. The terminal stations 301A and 302A transmit sensing results (received signal power ratios, for example) obtained by the sensing and position information of their own acquired by GPS or the like to the base station 201A.

Next, operation of the base station 201A will be described. The base station 201A creates a sensing map on the basis of the sensing results collected from the plurality of terminal stations 301A and 302A. By this sensing map, it becomes clear in which area which frequency band is currently used by the base station 101 of the other radio system 11. For example, the base station 201A uses a frequency band which is assigned to or of which a preferential use is permitted to the base station 101, outside the cover area of the base station 101. By this way, it is possible to perform communication or broadcasting capable of avoiding a co-channel interference.

That is, in the fourth illustrative embodiment described above, the own radio system 12 estimates an area where a frequency band which is assigned to or of which a preferential use is permitted to the other radio system 11 is used. On the basis of the estimation result, by performing adequate radio resources management, the own radio system 12 can use efficiently a frequency band which is assigned to or of which a preferential use is permitted to the other radio system 11. Accordingly, frequency utilization efficiency can be improved.

In the above description, an example has been shown where a sensing map is created using the positions the terminal stations 301A and 302A exist, but it is not the only case. For example, it is possible to divide an area covered by the base station 201A of the own radio system 12 into a plurality of zones (grids), and create a sensing map regarding a sensing result at a terminal station as a value at a zone where the terminal station exists. A zone may be a square such as of one kilometer square and ten meters square, and also may be a rectangle such as ten meters long and twenty meters wide.

In this case, a region where a grid of a received signal power ratio equal to or larger than a signal power ratio threshold value and a grid of a received signal power ratio smaller than the signal power ratio threshold value neighbor each other corresponds to a boundary of the cover area of the base station 101, and it thus becomes clear which frequency band can be used in each grid.

Further, it is also possible, for example, to locate a plurality of observation spots in the area covered by the base station 201A of the own radio system 12, and create a sensing map regarding a sensing result at a terminal station as a value at an observation spot which is closest to the terminal station. The observation points may be located at a constant interval of distance such as every one kilometer or every ten meters in both the east and west and the north and south directions, and also may be located at an interval depending on direction such as every ten meters in the east and west direction and every twenty meters in the north and south direction. Furthermore, it is possible to set the observation spots arbitrarily, taking into account geographical conditions such as landscapes and buildings in the area covered by the base station 201 of the own radio system 12.

In this case, a region where an observation spot of a received signal power ratio equal to or larger than a signal power ratio threshold value and an observation spot of a received signal power ratio smaller than the signal power ratio threshold value neighbor each other corresponds to a boundary of the cover area of the base station 101, and it thus becomes clear which frequency band can be used at each observation spot.

On the other hand, it is also possible to estimate a frequency band used by the other radio system 11 for each grid or observation spot without determining a boundary. On the basis of the estimation result, by performing adequate radio resources management, the own radio system 12 also can use a frequency band which is assigned to or of which a preferential use is permitted to the other radio system 11.

In the base station 201A (refer to FIG. 17) described above, the determination unit of frequency band/area for communication 521 is not necessarily needed. It is because the radio resources management unit 550 of the base station 201A can calculate "information on frequency band/area for communication" by itself, on the basis of mapping information it receives directly from the sensing map generation unit 520.

With respect to the present illustrative embodiment, description has been given focusing on the processes at the base stations 101 and 201A, but it would not be necessary to say that similar processes can be performed also at the base stations 102 and 103. Further, when the number of base stations existing in an other radio system 11 is equal to or smaller than two, or equal to or larger than four (that is, when a frequency band is divided into a plurality of bands), a utilization status can be estimated on each of the plurality of frequency bands, by performing processes similar to that described above with respect to each of the above-described base stations. In another case where a plurality of other radio systems 11 each including at least one base station exist, a utilization status can be estimated on each frequency band by performing processes similar to that described above with respect to each of the radio systems.

Further, the present illustrative embodiment has been described taking as an example the case where a sensing map is created at the base station, but it is not the only case. Also possible is an ad hoc-like configuration where a certain terminal station, in place of the base station, creates a sensing map, collecting sensing results at the other terminal stations. Here, although it could be assumed that a relay station exists between the base station and the terminal stations, such a relay station can be regarded as a kind of terminal station connected to the base station or as a kind of base station to which the terminal stations are connected. Accordingly, the case where the creation of a sensing map is performed at a relay station is not excluded.

Further, when a plurality of terminal stations constitute an ad hoc-like network, it is also possible that a predetermined terminal station (for example, a terminal station which judges a utilization status of a frequency band targeted for use) performs radio resources management, without transmitting sensing results to the base station, and communication or broadcasting is thereby performed between the plurality of terminal stations. In this case, the predetermined terminal station comprises a radio resources management unit. The radio resources management unit used in this case can be an identical one with the radio resources management unit 550 shown in FIG. 5. In this case, the radio resources management unit performs radio resources management on the basis of a "utilization status estimation result" which is received from its own or another terminal station, or from a base station (for example, the base station 201).

This terminal station may further comprise the determination unit of frequency band/area for communications 521. In this case, the radio resources management unit of the terminal station manages radio resources used in the own radio system 12, on the basis of "information on frequency band/area for communication" outputted from the determination unit of frequency band/area for communication 521. As the management of radio resources, for example, selection of a frequency band to use, transmission power control, or management of communication method/modulation method/coding rate and the like can be mentioned. Further, in the terminal station, the determination unit of frequency band/area for communication 521 is not necessarily needed. It is because the radio resources management unit of the terminal station also can calculate "information on frequency band/area for communication" by itself, on the basis of mapping information it receives directly from the sensing map generation unit.

Further, in the base station 201A, the receiving antenna 501 and the transmission antenna 514 can be combined into one common antenna. In this case, the common antenna can be used in a time division manner in accordance with a purpose of the use (for example, receiving or transmission).

The Fifth Illustrative Embodiment

Differences between this illustrative embodiment and the fourth illustrative embodiment will be described below. Here, a radio system of the present illustrative embodiment is assumed to be equivalent to the radio system shown in FIG. 2. A base station of the own radio system 12 in this case is assumed to be the base station 201A of the fourth illustrative embodiment. In the fourth illustrative embodiment, each terminal station transmits position information of its own, which is acquired by GPS or the like, to the base station of the own radio system 12. On the contrary, in the case of the present illustrative embodiment, each terminal station transmits an estimated arrival direction value of a radio wave from each base station of the other radio system 11 to the base station of the own radio system 12. Corresponding to it, a method of generating a sensing map at the base station 201A of the own radio system 12 is also different from that in the fourth illustrative embodiment. While, a sensing result in the fifth illustrative embodiment is a received signal power ratio, as in the fourth illustrative embodiment.

Each terminal station performing sensing calculates a received signal power ratio between each base station of the other radio system 11 and the base station 201A of the own radio system 12, and also estimates a radio wave arrival direction from each base station. Then, it informs the base station 201A of the received signal power ratios and the estimated values of radio wave arrival directions from respective base stations.

Here, the received signal power ratio and the estimated values of radio wave arrival directions are transmitted to the base station as sensing results, where the received signal power ratios and the estimated values of radio wave arrival directions may be transmitted as they are, as the transmitted information, or they may be transmitted after being converted into a specific signal format (for example, coding, quantization and the like).

As methods of estimating an arrival direction of a radio wave, various methods are applicable. For example, the estimation can be performed using MUSIC (MUltiple SIgnal Classification) algorithm which estimates an arrival direction by an eigenvalue and an eigenvector of an array input correlation matrix. Of course, any other methods capable of estimating a radio wave arrival direction are applicable.

The base station 201A creates a sensing map on the basis of the sensing results (received signal power ratios) sent from respective terminal stations. Between the positions of the base stations of the other radio system 11, which have become clear in advance, and the base station 201, the sensing results are mapped aligning the radio wave arrival directions estimated at the respective terminal stations with directions toward the corresponding base stations (respective base stations of other radio system 11).

Figure 20:
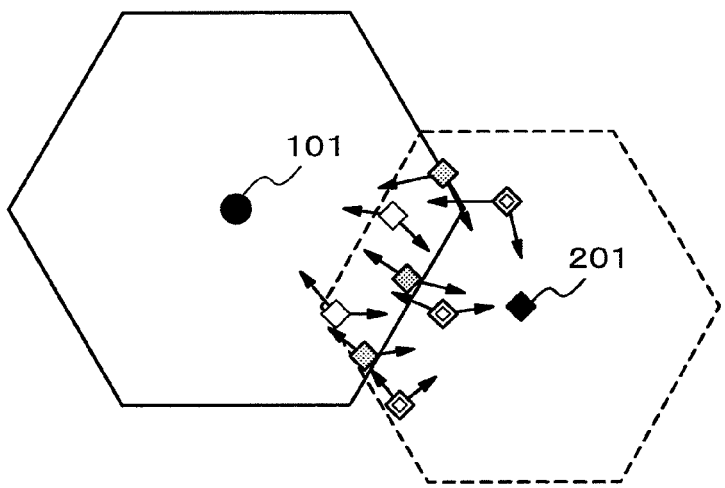
FIG. 20 a diagram showing an example of a sensing map created in a base station of the fifth illustrative embodiment.

FIG. 20 shows an example of a sensing map created at the base station 201A.

Here, as in the fourth illustrative embodiment, an area of a value equal to or larger than a predetermined signal power ratio threshold value is determined as within a cover area of a base station of the other system 11 (in the following, the base station 101 is taken as an example), and an area of a value smaller than the signal power ratio threshold value is determined as outside the cover area of the base station 101. Accordingly, a boundary line of the cover area of the base station 101 becomes clear.

Here, positions of the base stations of the other radio system 11 are assumed to be known in advance. As a method of acquiring the position information, applicable is acquisition from a database which integrates information such as on positions of base stations of each radio system and is downloadable, and also is acquisition through information exchange with the other radio system.

Further, it is also possible to divide an area covered by the base station 201A of the own radio system 12 into a plurality of zones (grids), and create a sensing map regarding a sensing result at a terminal station as a value at a zone where the terminal station exists. In this case, a region where a grid of a received signal power ratio equal to or larger than a signal power ratio threshold value and a grid of a received signal power ratio smaller than the signal power ratio threshold value neighbor each other corresponds to a boundary of the cover area of the base station 101, and it thus becomes clear which frequency band can be used in each grid.

Further, it is also possible to locate a plurality of observation spots in the area covered by the base station 201A of the own radio system 12, and create a sensing map regarding a sensing result at a terminal station as a value at an observation spot which is closest to the terminal station. In this case, a region where an observation spot of a received signal power ratio equal to or larger than a signal power ratio threshold value and an observation spot of a received signal power ratio smaller than the signal power ratio threshold value neighbor each other corresponds to a boundary of the cover area of the base station 101, and it thus becomes clear which frequency band can be used at each observation spot.

On the other hand, it is also possible to estimate a frequency band used by the other radio system 11 for each grid or observation spot without determining a boundary. On the basis of the estimation result, performing adequate radio resources management, the own radio system 12 can use a frequency band which is assigned to or of which a preferential use is permitted to the other radio system 11.

By this sensing map, it can be estimated in which area which frequency band is currently used by the other radio system 11. On the basis of the estimation result, performing adequate radio resources management, the own radio system 12 can use a frequency band which is assigned to or of which a preferential use is permitted to the other radio system 11.

The configuration of a terminal station of the present illustrative embodiment is identical with the configuration in FIG. 3, but there is a difference in a configuration of the sensing unit 403.

Figure 21:
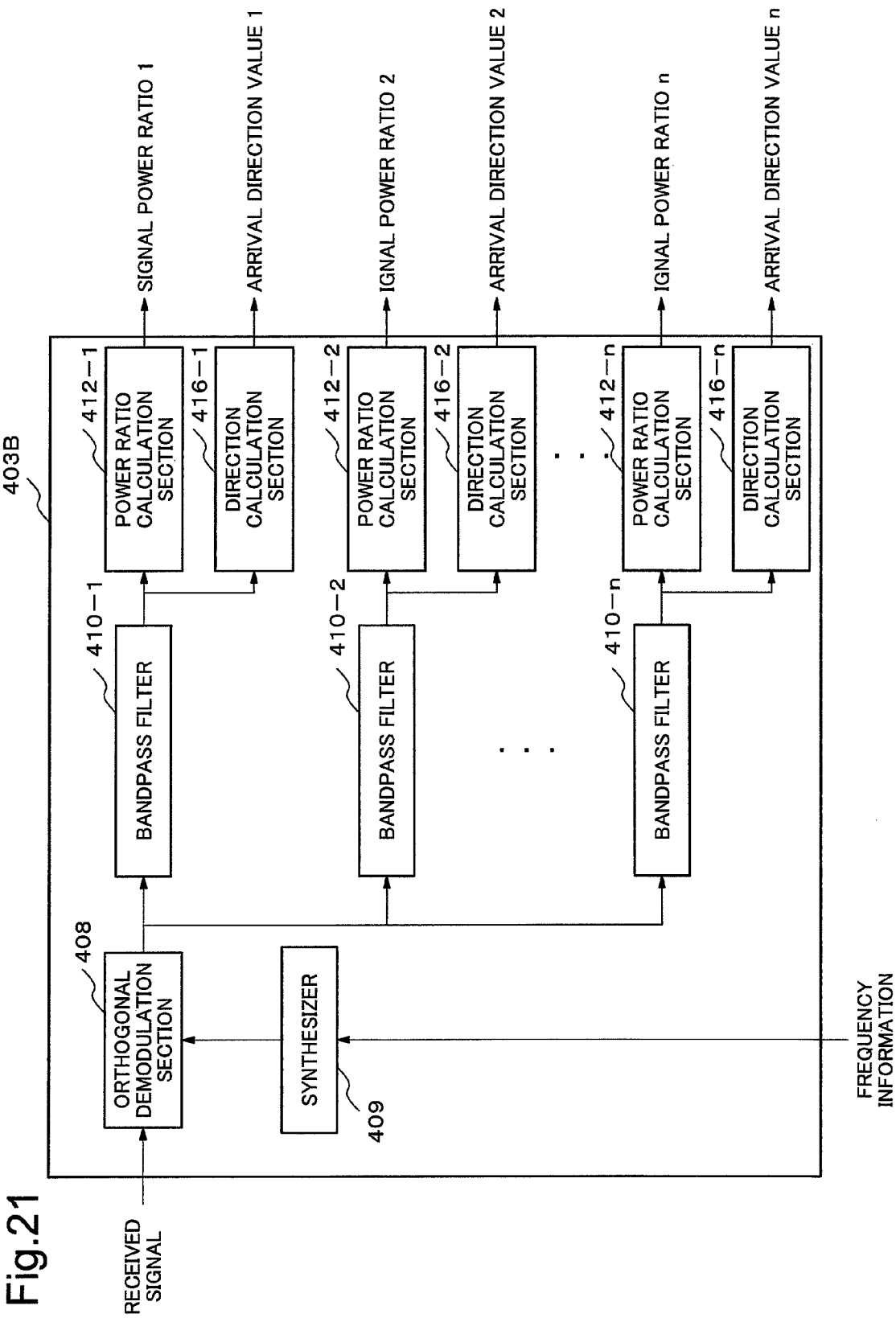
FIG. 21 a block diagram showing an illustrative configuration of a sensing unit constituting a terminal station in the fifth illustrative embodiment.

FIG. 21 is a block diagram showing an illustrative configuration of a sensing unit 403B which constitutes a terminal station of the fifth illustrative embodiment. The sensing unit 403B does not comprise the power value calculation units 411-1 to 411-*n* (refer to FIG. 4), but newly comprises direction calculation units 416-1 to 416-*n*. Since the rest of the portions of the configuration are similar to that of the sensing unit 403 (FIG. 4), the identical codes are given to them without giving description.

In the direction calculation units 416-1 to 416-*n*, radio wave arrival directions from the base stations using respective frequency bands are estimated using output signals from the band-pass filter units 410-1 to 410-n. As a method of the estimation, as described before, MUSIC algorithm can be adopted, for example.

The sensing unit 403B calculates, from received signals sent from the switch 402, received signal power ratios between the respective base stations of the other radio system 11 and the base station of the own radio system 12, and further estimates arrival directions of the radio waves from the respective base stations. These received signal power ratios and estimated values of radio wave arrival directions are inputted to the modulation unit 407, so as to be transmitted to the base station 201A as sensing results.

Next, operation of the base station 201A in the fifth illustrative embodiment will be described. The sensing map generation unit 520 maps the radio wave arrival directions estimated at the respective terminal stations onto a sensing map, aligning them with directions toward the corresponding base stations. By performing this operation, through the information on at which position a received signal power ratio is equal to or larger than or is smaller than a predetermined signal power ratio threshold value, a boundary line of a cover area of each base station becomes clear.

As has been described above, according to the fifth illustrative embodiment, terminal stations existing in the cover area of the base station of the own radio system 12 calculate received signal power ratios between the respective base stations of the other radio system 11 and the base station of the own radio system 12, and further estimate radio wave arrival directions from those base stations. Using these calculation and estimation results, at the own radio system 12, estimated is a frequency band which is assigned to or of which a preferential use is permitted to the other radio system 11. By adequately performing radio resources management based on the estimated results, an efficient use becomes possible of a frequency band which is assigned to or of which a preferential use is permitted to the other radio system 11.

Further, in the case of the present illustrative embodiment, since a sensing map is created using estimated values of radio wave arrival directions, a function to acquire position information such as of GPS becomes unnecessary. Accordingly, a configuration of a sensing apparatus is allowed to be simple.

With respect to the fifth illustrative embodiment described above, description has been given focusing on the processes at the base stations 101 and 201A, but it would not be necessary to say that similar processes can be performed also at the base stations 102 and 103. Further, when the number of base stations existing in an other radio system 11 is equal to or smaller than two, or equal to or larger than four (that is, when a frequency band is divided into a plurality of bands), a utilization status can be estimated on each of the plurality of frequency bands, by performing processes similar to that described above with respect to each of the above-described base stations. In another case where a plurality of other radio systems 11 each including at least one base station exist, a utilization status can be estimated on each frequency band by performing processes similar to that described above with respect to each of the radio systems.

Further, also possible is an ad hoc-like configuration where a certain terminal station, in place of the base station, creates a sensing map, collecting sensing results at the other terminal stations. Here, although it could be assumed that a relay station exists between the base station and the terminal stations, such a relay station can be regarded as a kind of terminal station connected to the base station or as a kind of base station to which the terminal stations are connected. Accordingly, not excluded is the case where the estimation of a utilization status of a frequency band targeted for use is performed at a relay station.

Further, when a plurality of terminal stations constitute an ad hoc-like network, it is also possible that a predetermined terminal station (for example, the terminal station which judges a utilization status of a frequency band targeted for use) performs radio resources management, without transmitting sensing results to the base station, and communication or broadcasting is thereby performed between the plurality of terminal stations.

The Sixth Illustrative Embodiment

A characteristic of the present illustrative embodiment is to set a different repetition rate of sensing operation for each terminal station. With a change in an arrival status of a radio wave and that in a communication status of the other radio system 11, also changes the cover area of the other radio system 11 using a frequency band targeted for use. Due to this, it becomes necessary to update a sensing map in response to a change in the cover area. In such a case, because a change occurs at a boundary of the cover area, updating of a sensing map may be performed focusing on the vicinity of a boundary of a cover area of each base station. Accordingly, in the case of the present illustrative embodiment, a repetition rate is set higher for a terminal station existing in the vicinity of a cover area boundary of each base station of the other radio system 11, and it is set lower for a terminal station existing away from boundaries.

Here, determination of whether each terminal station exists in the vicinity of a cover area boundary is performed by comparing a distance d between a position of each terminal station and a cover area boundary of a corresponding base station of the other radio system 11 and a predetermined threshold value TH1 in terms of a distance from a boundary. When distance d is smaller than the threshold value TH1, the terminal station is determined as a terminal station existing in the vicinity of the boundary, and it performs sensing at a higher repetition rate. On the other hand, when distance d is equal to or larger than the threshold value TH1, the terminal station is determined as a terminal station existing away from the boundary, and it performs sensing at a lower repetition rate.

Figure 22:
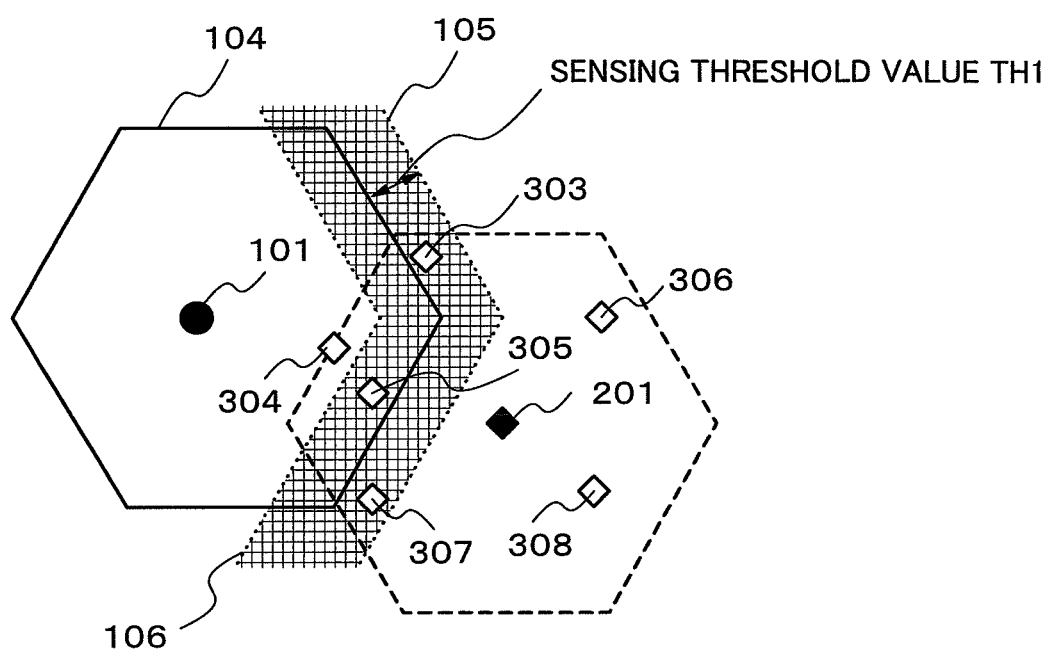
FIG. 22 an example of a conceptual diagram of judgment in the sixth illustrative embodiment of whether or not a terminal station is in the vicinity of a boundary of a cover area of a specific base station of another radio system.

FIG. 22 is an example of a conceptual judgment diagram for, in the sixth illustrative embodiment, judging whether or not terminal stations 303-308 exist in the vicinity of a boundary of a cover area 104 of a specific base station (in the following, the base station 101 is taken as an example) of the other radio system 11. As shown in FIG. 22, assumed is the case where the base station 101 of the other radio system 11, the base station 201 of the own radio system 12 and the terminal stations 303-308 exist. When a threshold value TH1 such as shown in FIG. 22 is set, a range in which a distance from a cover area boundary of the base station 101 of the other radio system 11 is smaller than the threshold value TH1 results in the range which is surrounded by boundary lines 105 and 106 and depicted with latticework (here, only that on the side of the base station 201 is illustrated). The terminal stations 303, 305 and 307 included in this range are controlled to perform sensing at a higher repetition rate, and the terminal stations 304, 306 and 308 not included in the range are controlled to perform sensing at a lower repetition rate.

Figure 23:
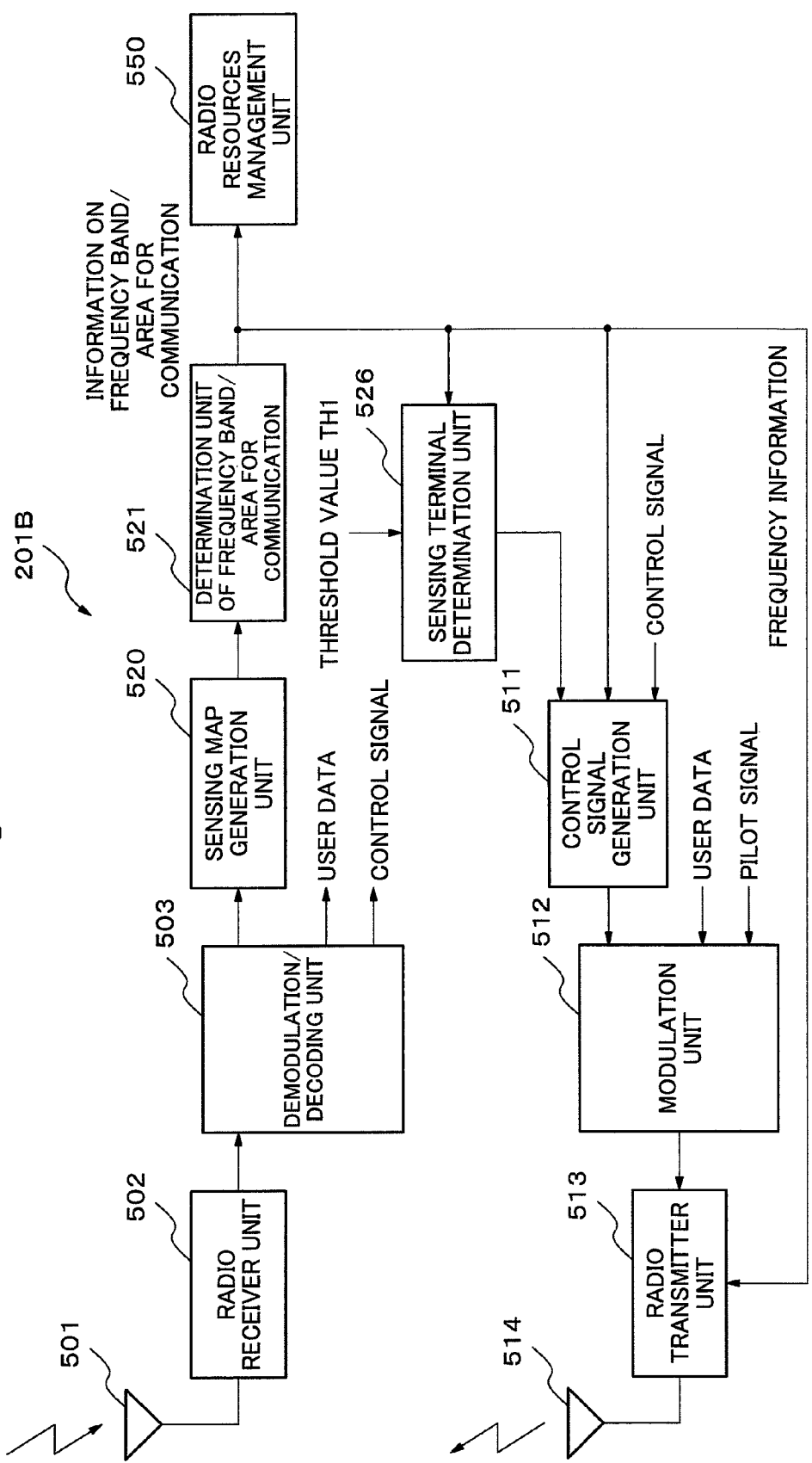
FIG. 23 a block diagram showing an illustrative configuration of a base station of the sixth illustrative embodiment.

FIG. 23 is a block diagram showing an illustrative configuration of a base station 201B of the sixth illustrative embodiment. The difference between the base station 201B and the base station 201A of the fourth illustrative embodiment (refer to FIG. 17) is that the base station 201B further comprises a sensing terminal determination unit 526 (a means for determining sensing). Except this sensing terminal determination unit 526, the configuration of the base station 201B is identical with that shown in FIG. 17, and therefore the identical codes are given in FIG. 23 without giving description.

The sensing terminal determination unit 526 extracts a terminal station existing in the vicinity of a boundary of a cover area of a base station subjected to the sensing, of the other radio system 11, on the basis of "information on frequency band/area for communication" received from the determination unit of frequency band/area for communication 521 and a threshold value TH1 in terms of a distance from a boundary, which are received from a predetermined apparatus, The sensing terminal determination unit 526 outputs information on the terminal station to the control signal generation unit 511. The above-mentioned "information on frequency band/area for communication" is information about the frequency bands f1-f3 the other radio system 11 is using, and about the areas where the frequency bands are used.

Here, the number of threshold values TH1 is not limited to one. For example, it is also possible to update a sensing map, setting a plurality of threshold values (TH1, TH 2, . . . ; TH1<TH2< . . . ) and setting different repetition rates of sensing for respective regions each determined by one of the threshold values. By setting a sensing interval as T1 for terminal stations existing in the range determined by TH1, and as T2 for terminal stations existing in the range determined by TH2, and setting T1<T2, it becomes possible that sensing is performed at a higher repetition rate at terminal stations of higher necessity of updating.

Further, in the above, description has been given of the illustrative embodiment of the case where terminal stations existing in the vicinity of a boundary of a cover area of the other radio system 11 perform sensing at a higher repetition rate, but a method of selecting terminal stations to perform sensing is not limited to it. For example, also applicable is a method where terminal stations existing away from a base station of the other radio system 11 do not perform sensing of the base station.

Figure 24:
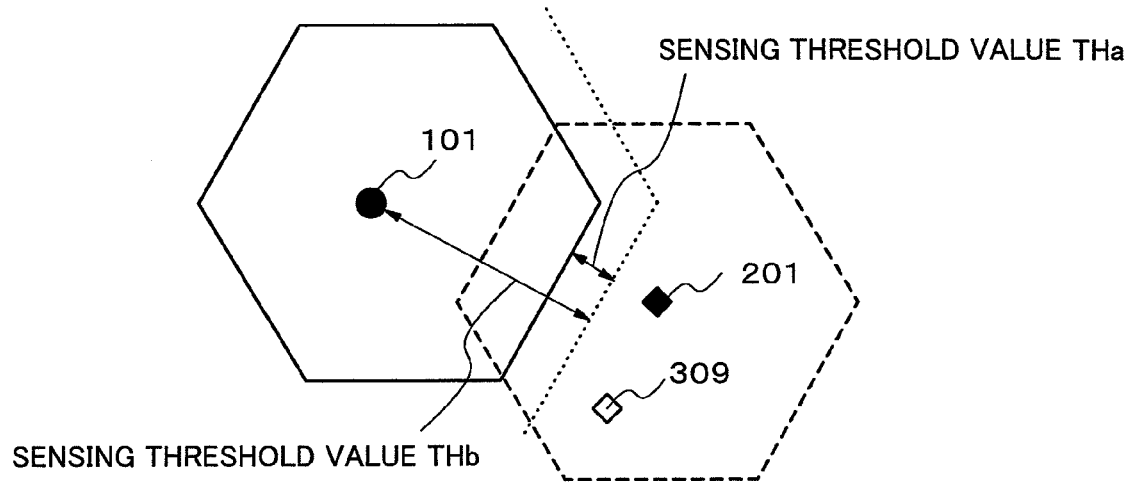
FIG. 24 a conceptual diagram of determination in the sixth illustrative embodiment where a terminal station existing more than a predetermined distance away from a specific base station of another radio system or that existing more than a predetermined distance away from a cover area of a specific base station is determined.

FIG. 24 is a conceptual determination diagram for, in the sixth illustrative embodiment, determining a terminal station (for example, the terminal station 309) existing more than a predetermined distance away from a specific base station of the other radio system 11 (for example, the base station 101), or a terminal station (for example, the terminal station 309) existing more than a predetermined distance away from a cover area of a specific base station of the other radio system 11 (for example, the base station 101). Here, a sensing threshold value in terms of the distance from the base station 101 is set as THb, and a sensing threshold value in terms of the distance from the cover area of the base station 101 is set as THa.

As has been described above, in the sixth illustrative embodiment, sensing is performed intensively at a terminal station existing in an area where variation of the cover area is highly possible to occur (that is, within a boundary line whose distance from the cover area boundary is the threshold value TH1). Accordingly, updating rate of a sensing map improves and immediate response to cover area variation becomes possible, compared to the case where all terminal stations perform sensing at an identical repetition rate (a repetition rate lower than the higher repetition rate mentioned above).

Moreover, with respect to a terminal station not existing in the vicinity of a boundary of the cover area, its repetition rate of sensing can be set as relatively lower than that of when the sensing is performed at high repetition rate (in certain instances, might be lower than the repetition rate of the case where an identical repetition rate is set for all terminal stations). Accordingly, power consumption of the entire system can be suppressed.

The above description has been given of the case, as an example, where the sensing is performed at a higher repetition rate at a terminal station existing in the vicinity of a boundary of the cover area of the base station 101 of the other radio system 11, but a way of selecting a terminal station to perform sensing is not limited to the above-described example. That is, it is also possible that the sensing terminal determination unit 526 determines whether to perform sensing or not itself, with respect to each terminal station. For example, it is possible that sensing is not performed with respect to a specific base station of the other radio system 11, at a terminal station existing a predetermined distance away from the base station (or at a terminal station existing a predetermined distance away from a cover area of the specific base station). Alternatively, it is also possible for the sensing terminal determination unit 526 to limit a terminal station to perform sensing to any one of; a terminal station existing in the vicinity of an area boundary of a base station of the other radio system, a terminal station existing within a certain distance from a base station of the other radio system 11, and a terminal station existing within a certain distance from a boundary of a base station of the other radio system 11.

In the base station 201B (refer to FIG. 23) described above, the determination unit of frequency band/area for communication 521 is not necessarily needed. It is because the sensing terminal determination unit 526 of the base station 201B can calculate "information on frequency band/area for communication" by itself, on the basis of mapping information it receives directly from the sensing map generation unit 520.

With respect to the sixth illustrative embodiment, description has been given taking as an example the case where determination of a terminal station to perform sensing (or determination of a repetition rate of sensing) is performed at the base station 201B of the own radio system 12, but it is not the only case. For example, when communication or broadcasting is performed between terminal stations, also possible is a configuration where a certain terminal station collects sensing results and thereby determines a terminal station to perform sensing. In this case, the terminal station can be equipped with a configuration which is equivalent to the sensing terminal determination unit 526.

The Seventh Illustrative Embodiment

A characteristic of the present embodiment is that a plurality of terminal stations are divided into groups and sensing is performed being shared within a group.

Figure 25:
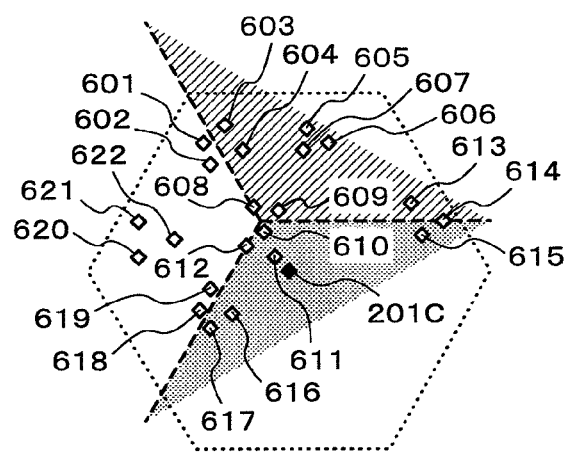
FIG. 25 in relation to the seventh illustrative embodiment, a cover area diagram showing a scattering status of terminal stations existing within a cover area of a base station of a radio system it inhabits.

FIG. 25 is a cover area diagram, in relation to the seventh illustrative embodiment, showing a scattering status of terminal stations 601-622 existing in a cover area of a base station 201C of the own radio system (description will be given later of the details).

Figure 26:
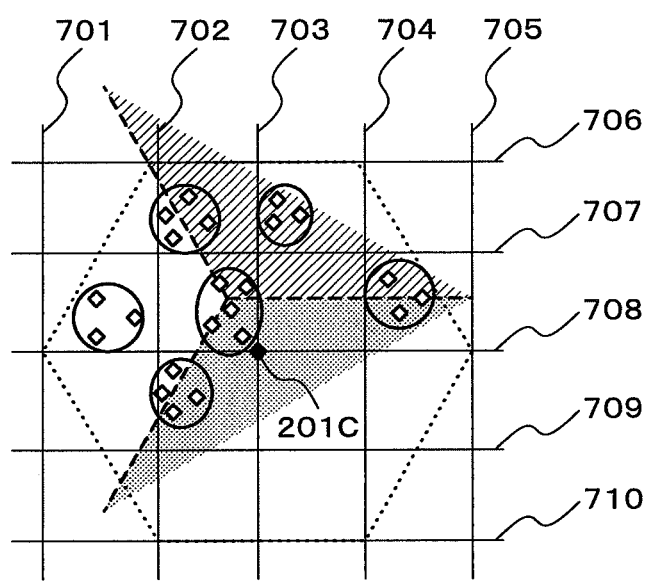
FIG. 26 in relation to the seventh illustrative embodiment, a conceptual diagram showing an example of a method of grouping a plurality of terminal stations within a cover area of a base station of the own radio system.

FIG. 26 is a conceptual diagram, in relation to the seventh illustrative embodiment, showing an example of a method of grouping a plurality of terminal stations in the cover area of the base station 201C of the own radio system 12.

As shown in FIG. 26, it also can be considered to divide the cover area of the base station 201 into a plurality of grids with longitudinal lines 701-705 and lateral lines 706-710, and group together the terminal stations existing in the same grid into the same group. There is another way of grouping such as that the terminal stations at which a received signal power value from a specific base station is within a certain range are grouped together into the same group, and an optimum grouping method can be adopted in each radio system.

When terminal stations are thus divided into a plurality of groups, since sensing results at the terminal stations existing in the same group are expected to resemble each other, it is not necessary that whole terminal stations in a group perform sensing simultaneously, and it is only necessary that any one terminal station performs sensing as a representative.

As a method of determining a representing terminal station, a method where the determination is performed based on a descending order (or an ascending order) of the terminal station ID can be mentioned. Alternatively, a representing terminal station may be determined by a descending order (or an ascending order) of the terminal station class, of the elapsed time from the start of an active mode, or of the number of times of sensing performed until the present time. Further, it is also possible to perform the control to make the terminal stations to take turns in performing sensing (in other words, the control to change a representing terminal station which performs sensing), on the basis of a predetermined standard. Of course, also possible is a method where only a specific terminal station performs sensing with no alternation of a representing terminal station.

Figure 27:
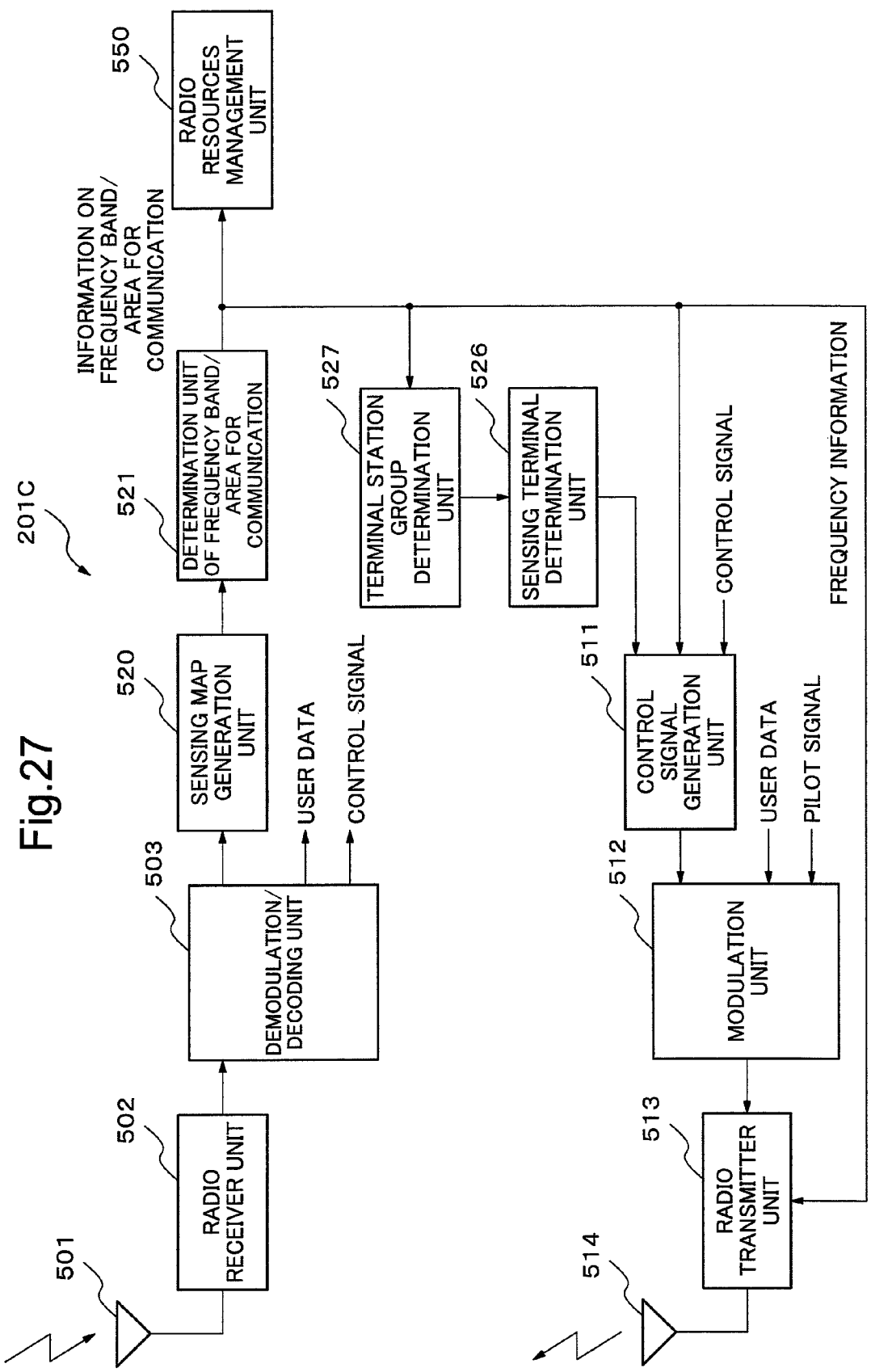
FIG. 27 a block diagram showing an illustrative configuration of a base station of the seventh illustrative embodiment.

FIG. 27 is a block diagram showing an illustrative configuration of a base station 201C of the seventh illustrative embodiment.

The difference between the base station 201C and the base station 201B of the sixth illustrative embodiment (FIG. 23) is that the base station 201C further comprises a terminal station group determination unit 527 (a means for determining a group). Except this terminal station group determination unit 526, the configuration of the base station 201C is identical with that shown in FIG. 23, and therefore the identical codes are given in FIG. 27 without giving description. In the following, as shown in FIG. 25, terminal stations 601-622 are assumed to exist in the cover area of the base station 201.

The terminal station group determination unit 527 receives "information on frequency band/area for communication" from the determination unit of frequency band/area for communication 521. Here, the "information on frequency band/area for communication" is information about the frequency bands f1-f3 the other radio system 11 is using, and about the areas where the frequency bands are used. The terminal station group determination unit 527 performs grouping of terminal stations in accordance with a predetermined rule. Grouping information of terminal stations is outputted to the sensing terminal determination unit 526. The sensing terminal determination unit 526 selects and determines a terminal station which performs sensing (also called representing terminal station) from each group of terminal stations. The methods of determining a terminal station are as described above.

As has been described above, according to the seventh illustrative embodiment, a plurality of terminal stations are divided into groups, and they take turns in performing sensing. Accordingly, compared to when all terminal stations perform sensing, a signaling overhead due to signal transmission and receiving between the terminal stations and the base station associated with sensing can be reduced. Further, since unnecessary sensing operation is not performed, battery exhaustion can be suppressed through reducing power consumption of the terminal stations. Furthermore, by giving priority to the sensing at the terminal stations of high necessity of sensing, updating speed of a sensing map can be improved, and immediate response to cover area variation of the other radio system 11 becomes possible.

The present illustrative embodiment is also applicable to the case where a plurality of base stations exist in the other radio system 11, and the case where a plurality of other radio systems 11 each including at least one base station exist. It would not be necessary to say that each frequency band can be detected by performing similar processes with respect to each base station or each radio system.

In the base station 201C (refer to FIG. 27) described above, the determination unit of frequency band/area for communication 521 is not necessarily needed. It is because the terminal station group determination unit 527 of the base station 201C also can calculate "information on frequency band/area for communication" by itself, on the basis of mapping information it receives directly from the sensing map generation unit 520.

With respect to the present illustrative embodiment, description has been given taking as an example the case where determination of terminal station groups is performed at the base station 201C of the own radio system 12, but when communication or broadcasting is performed between the terminal stations, the configuration can be such that a certain terminal station collects sensing results and thereby determines terminal station groups. In this case, the terminal station can be equipped with a configuration which is equivalent to the terminal station group determination unit 527.

The Eighth Illustrative Embodiment

A characteristic of the present illustrative embodiment is that the base station of the own radio system 12 comprises a radio wave propagation estimation function, sets the estimation result as an initial value of a sensing map, and makes a terminal station existing in the vicinity of a cover area boundary of a base station of the other radio system 11 perform sensing preferentially. The radio wave propagation estimation function of the base station uses received signal power ratios which can be derived from the radio wave propagation estimation results on the base stations of the other radio system 11 and on the base station of the own radio system 12, as initial values for creating a sensing map. The radio wave propagation estimation function of the base station enables a terminal station existing in the vicinity of a cover area boundary of a base station of the other radio system 11 to perform preferentially.

The base station of the own radio system 12 receives base station location information of the other radio system 11 and of the own radio system 12, information on transmission powers of the base stations, antenna parameter information, and map information including landscapes in the area and information on existing buildings, and the like, as input parameters. On the basis of the input parameters, the base station of the own radio system 12 estimates received signal levels in the cover areas of the base stations of the other radio system 11 and of the own radio system 12. Here, the information on the base stations of the other radio system 11 may be acquired from a data center or through communication between the base stations.

The estimation results include position information (information specifying a place, such as latitude and longitude) and received signal power values or propagation loss values, at the position, of the radio waves transmitted from the base stations. Using the estimation results, the base station of the own radio system 12 calculates received signal power ratios between the respective base stations of the other radio system 11 and the base station of the own radio system 12, and maps the calculation results onto a sensing map. Then, on the basis of the sensing map, the base station of the own radio system 12 judges an area of a received signal power ratio equal to or larger than a preset signal power ratio threshold value as inside the cover area of a base station of the other radio system 11.

When cover areas of the base stations of the other radio system 11 become clear, sensing can be performed preferentially at a terminal station existing in the vicinity of a cover area boundary. Here, whether or not a terminal station exists in the vicinity of a cover area boundary can be determined using a threshold value in terms of the distance from a cover area boundary TH1, such as shown in the sixth illustrative embodiment.

Figure 28:
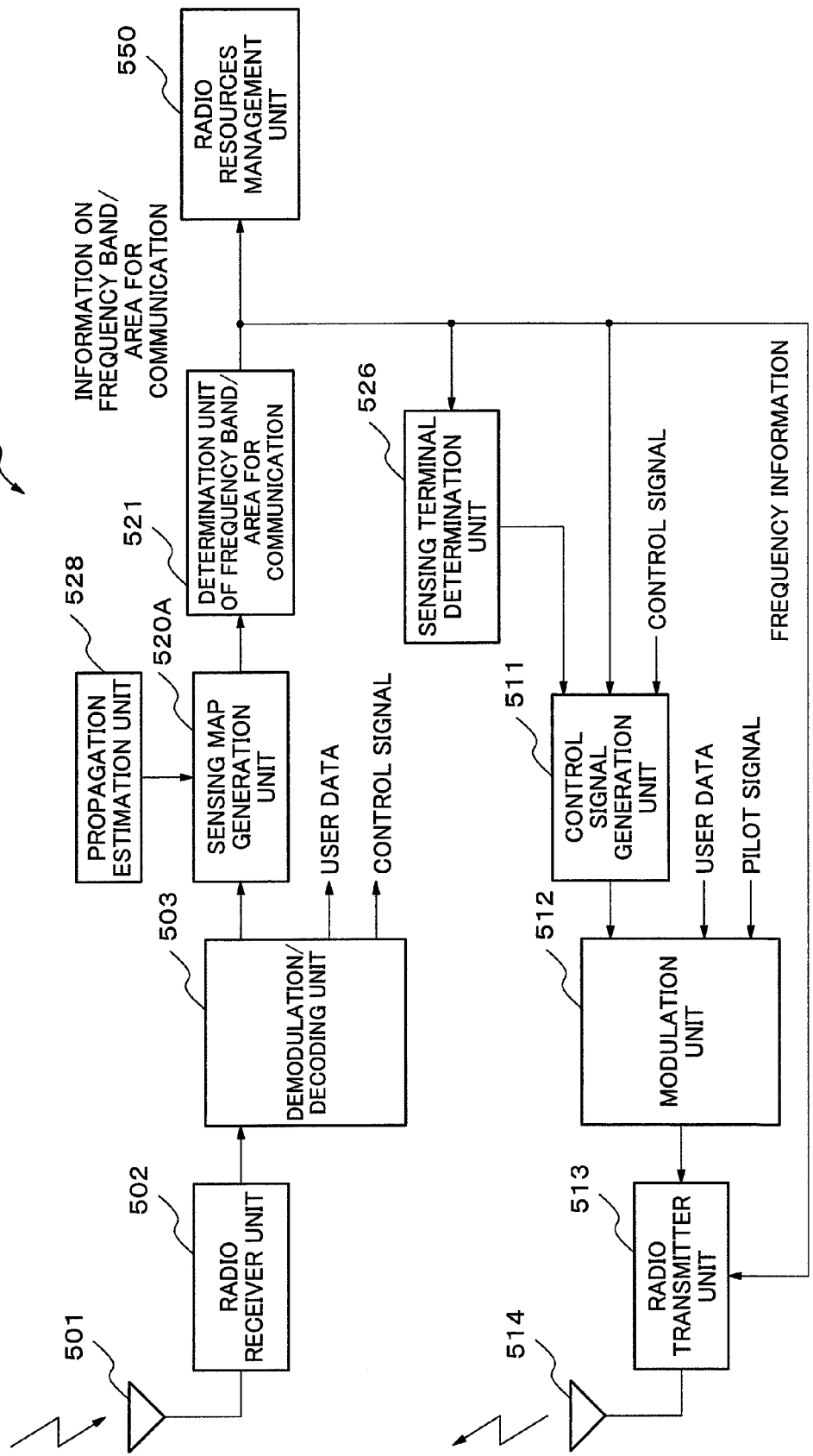
FIG. 28 a block diagram showing an illustrative configuration of a base station of the eighth illustrative embodiment.

FIG. 28 is a block diagram showing an illustrative configuration of a base station 201D of the eighth illustrative embodiment. The difference between the base station 201D and the base station of the sixth illustrative embodiment. (FIG. 23) is that the base station 201D further comprises a propagation estimation unit 528 (a means for estimating radio wave propagation). Further, the base station 201D comprises a sensing map generation unit 520A, in place of the sensing map generation unit 520 shown in FIG. 18. Except these units, the configuration of the base station 201D is identical with that shown in FIG. 23, and therefore the identical codes are given to them in FIG. 28 without giving description.

The propagation estimation unit 528 calculates, from the estimated received signal levels of the base stations of the other radio system 11 and of the base station of the own radio system 12, received signal power ratios between them, and outputs the calculation results, along with position information (information specifying a place, such as latitude and longitude), to the sensing map generation unit 520A.

Figure 29:
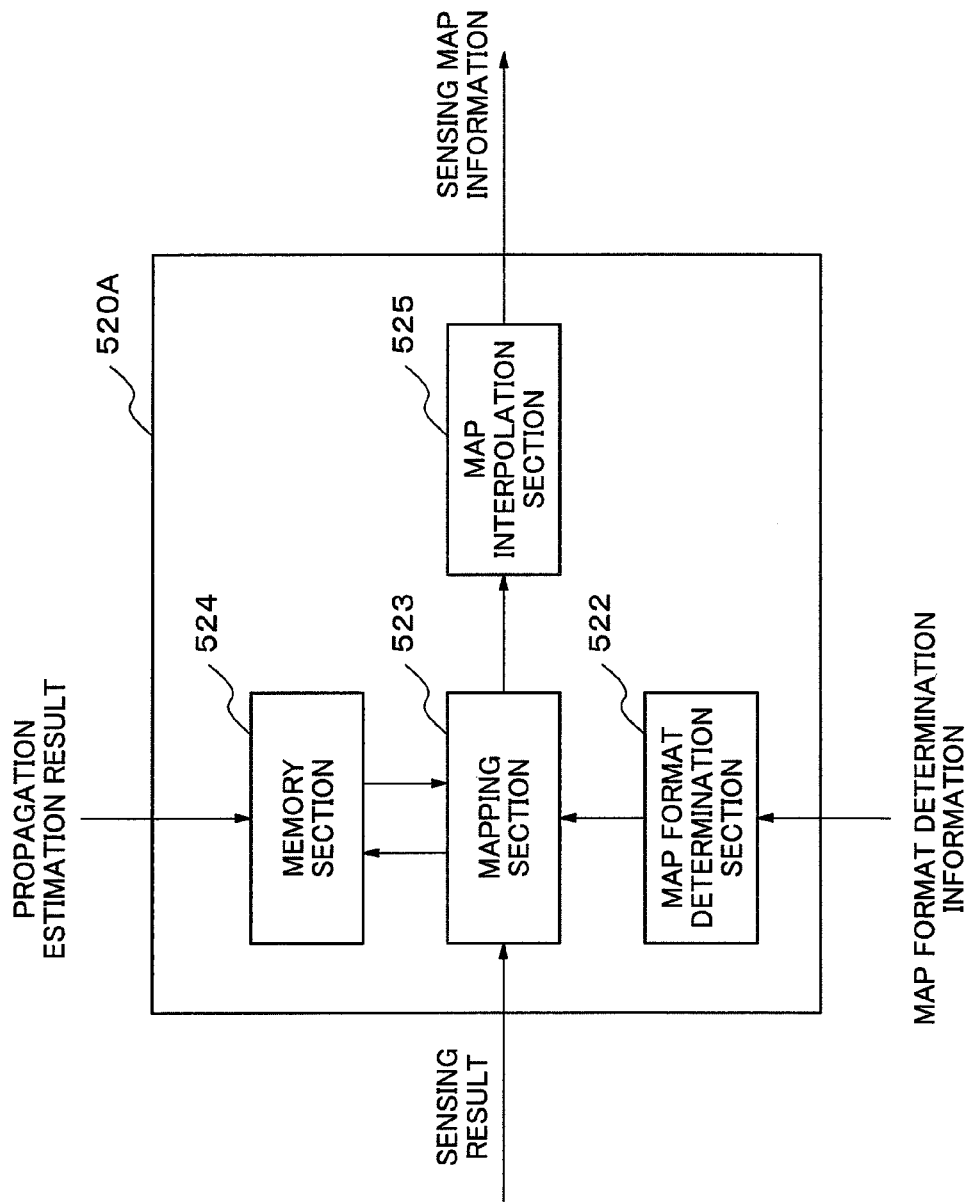
FIG. 29 a block diagram showing an illustrative configuration of a sensing map generation unit constituting a base station shown in FIG. 28.

FIG. 29 is a block diagram showing an illustrative configuration of the sensing map generation unit 520A which constitutes the base station 201D shown in FIG. 28. Results of propagation estimation are inputted to the memory unit 524 as initial values of a sensing map.

As has been described above, according to the eighth illustrative embodiment, by comprising a radio wave propagation estimation function (the propagation estimation unit 528), the base station 201D can obtain cover area information of the base stations of the other radio system 11 in advance. Accordingly, since the information can be used as initial values of a sensing map, a cover area of the other radio system 11 can be obtained immediately in the sensing map creation process.

Although the configuration in FIG. 29 is such that the output of the mapping unit 523 is inputted to the memory unit 524, it may be configured such that the output of the map interpolation unit 525 having undergone an interpolation process is inputted to the memory unit 524 and is stored there.

The present illustrative embodiment is also applicable to the case where a plurality of base stations exist in the other radio system 11, and the case where a plurality of other radio systems 11 each including at least one base station exist. It would not be necessary to say that each frequency band can be detected by performing processes similar to that described above with respect to each base station or each radio system.

With respect to the present illustrative embodiment, description has been given taking as an example the case where the radio wave propagation estimation function is provided at the base station, but when communication is performed between the terminal stations, it is possible for a certain terminal station to be provided with a radio wave propagation estimation function. In this case, the terminal station can be equipped with a configuration equivalent to the propagation estimation unit 528.

The Ninth Illustrative Embodiment

A characteristic of the present embodiment is that communication or broadcasting between transmitter stations and receiver stations is performed only between the transmitter and receiver stations satisfying a predetermined standard, which is determined taking into account an interference which a transmitted signal from a transmitter station may cause on transmission and receiving in the other radio system 11.

In the following, a method using a distance as a predetermined standard in consideration of interference is taken as an example.

Here, description will be given of the processes in the case where, for example, in the radio system 10 shown in FIG. 2, outside the cover area of a base station of the other radio system 11 using a frequency band targeted for use, the base station 201 of the own radio system 12 performs communication or broadcasting, using the frequency band. In this case, in the ninth illustrative embodiment, communication or broadcasting from the base station 201 to terminal stations is performed only with the terminal stations existing at the positions which are away from the base station by smaller distances than the distance between the base station 201 and a cover area boundary of a base station of the other radio system 11 which becomes clear on a sensing map. That is, communication or broadcasting between the base station 201 and terminal stations is performed with a required transmission power within a range not enough to enable the radio wave to reach inside the cover area of the other radio system 11.

Figure 30:
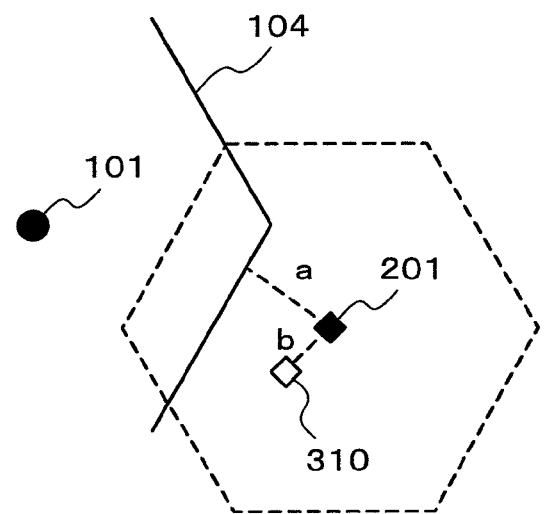
FIG. 30 in relation to the ninth illustrative embodiment, a first cover area diagram showing a positional relationship between a cover area of a base station of the own radio system, that of a base station of another radio system using the same frequency band as the former base station, and a terminal station.

In relation to the ninth illustrative embodiment, FIG. 30 is a first cover area diagram showing a positional relationship between a cover area of the base station 201 of the own radio system 12, a cover area 104 of a base station of the other radio system 11 (for example, the base station 101) which uses a frequency band identical with that used by the base station 201 of the own radio system 12, and a terminal station 310. Here, description will be given of the case of transmission from the base station 201 to the terminal station 310 (Downlink communication). In this case, it is assumed that the distance between the base station 201 and the cover area of the base station 101 of the other radio system 11 is expressed by a, and the distance between the base station 201 and the terminal station 310 by b. Further, in this case, it is assumed that the base station 101 of the other radio system 11 is using a frequency band identical to that used by the base station 201. In such a case, when distance a>distance b, the above-mentioned Downlink communication from the base station 201 to the terminal station 310 is enabled.

In this way, a transmitted radio wave from the base station 201 does not reach inside the cover area of the base station 101 of the other radio system 11, and accordingly an interference caused on receiver stations in the other radio system 11 can be suppressed.

Figure 31:
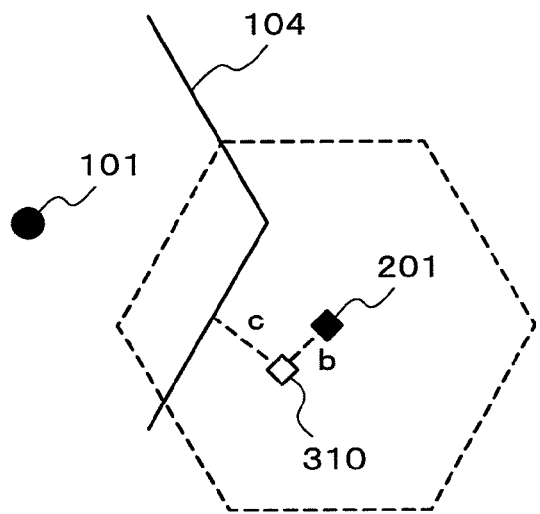
FIG. 31 in relation to the ninth illustrative embodiment, a second cover area diagram showing a positional relationship between a cover area of a base station of a radio system it inhabits, that of a base station of another radio system using the same frequency band as the former base station, and a terminal station.

In relation to the ninth illustrative embodiment, FIG. 31 is a second cover area diagram showing a positional relationship between a cover area of the base station 201 of the own radio system 12, a cover area 104 of a base station of the other radio system 11 (for example, the base station 101) which uses a frequency band identical with that used by the base station 201 of the own radio system 12, and the terminal station 310. Here, description will be given of the case of transmission from the terminal station 310 to the base station 201 (Uplink communication). In this case, it is assumed that the distance between the terminal station 310 and the cover area of the base station 101 of the other radio system 11 is expressed by c, and the distance between the base station 201 and the terminal station 310 by b. In such a case, when distance c>distance b, the above-mentioned Uplink communication from the terminal station 310 to the base station 201 is enabled.

In this way, a transmitted radio wave from the terminal station 310 does not reach inside the cover area of the base station 101 of the other radio system 11, and accordingly an interference caused on receiver stations in the other radio system 11 can be suppressed.

FIG. 32 is a block diagram showing an illustrative configuration of a base station 201E of the ninth illustrative embodiment. The base station 201E newly comprises a communication terminal determination unit 529 (determination means). Since the rest of the portions of the configuration of the base station 201E are similar to that of the base station 201A shown in FIG. 17, the identical codes are given in FIG. 32 without giving description.

The communication terminal determination unit 529 receives "information on frequency band/area for communication" from the determination unit of frequency band/area for communication 521. Here, the "information on frequency band/area for communication" is information about the frequency bands f1-f3 the other radio system 11 is using, and about the areas where the frequency bands are used. On the basis of the "information on frequency band/area for communication", the communication terminal determination unit 529 determines terminal stations with which communication or broadcasting is enabled.

First, description will be given of the case of Downlink communication from the base station 201E to a terminal station. When the distance between the base station 201E and a terminal station is equal to or smaller than the distance from the base station 201E to the cover area of a base station of the other radio system 11 using a frequency band the base station 201E desires to use, the base station 201E enables the Downlink communication.

Next, description will be given of the case of Uplink communication from a terminal station to the base station 201E. When the distance between a terminal station and the base station 201E is equal to or smaller than the distance from the terminal station to the cover area of a base station of the other radio system 11 using a frequency band the base station 201E desires to use, the base station 201E enables the Uplink communication.

Then, output signals of the communication terminal determination unit 529 (information on the terminal stations with which communication or broadcasting is enabled) are sent to the radio resources management unit 550, and are submitted for radio resources management of the own radio system 12.

In the ninth illustrative embodiment described above, communication or broadcasting between transmitter stations and receiver stations is performed only between the transmitter and receiver stations satisfying a predetermined standard, which is determined taking into account an interference which a transmitted signal from a transmitter station may cause on transmission and receiving in the other radio system 11. Accordingly, while avoiding causing an interference on the other radio system 11, communication or broadcasting can be performed even using a frequency band which is assigned to or of which a preferential use is permitted to the other radio system 11.

In the ninth illustrative embodiment described above, the case where a distance is used as a standard in consideration of interference has been taken as an example, but it is not the only case. For example, it is also possible to enable communication or broadcasting in the own radio system 12 only when a ratio between a received signal power value of a base station of the other radio system 11 and that of the base station of the own radio system 12 satisfies a predetermined standard, where both the base stations use an identical frequency band.

For example, communication or broadcasting in the own radio system 12 is enabled only when a ratio (P1/P2) of a received signal power value of the base station of the other radio system 11 (P1) to that of the base station of the own radio system 12 (P2) is equal to or larger than a predetermined threshold value THp.

In the base station 201E (refer to FIG. 32) described above, the determination unit of frequency band/area for communication 521 is not necessarily needed. It is because the communication terminal determination unit 529 of the base station 201E also can calculate "information on frequency band/area for communication" by itself, on the basis of mapping information it receives directly from the sensing map generation unit 520.

With respect to the ninth illustrative embodiment, description has been given taking as an example the case where determination of terminal stations with which communication or broadcasting is enabled is performed at the base station 201E of the own radio system 12, but it is not the only case. For example, when communication or broadcasting is performed between the terminal stations, the configuration can be such that a certain terminal station collects sensing results and thereby determines terminal stations with which communication or broadcasting is enabled. In this case, the terminal station can be equipped with a configuration equivalent to the communication terminal determination unit 529.

It has been described that, in the first to ninth illustrative embodiments described above, base stations and terminal stations are controlled by dedicated hardware. However, these base stations and terminal stations can be designed to operate being controlled by a computer circuit not illustrated in the figures (for example, CPU (Central Processing Unit)) on the basis of control programs. In this case, these control programs are stored in storage mediums within base stations and terminal stations or in external storage mediums, and are read and executed by the above-mentioned computer circuit. As inner storage mediums, for example, ROM (Read Only Memory), a hard disk and the like can be mentioned. As external storage mediums, for example, removable media, a removable disk and the like can be mentioned.

Above, the present invention has been described with reference to the illustrative embodiments, but the present invention is not limited to the above-described illustrative embodiments. With respect to configurations and details of the present invention, various changes which can be understood by those skilled in the art may be made within the scope of the present invention.

This application insists on priority based on Japanese Patent Application No. 2009-218751 proposed on Sep. 24, 2009 and takes everything of the disclosure here.

REFERENCE SIGNS LIST 1 base station
2 estimation unit
10 radio system
11 another radio system
12 own radio system
101-103 base station (of another radio system)
201, 201A, 201B, 201C, 201D and 201E base station (of own radio system)
301-310, 301A, 302A and 601-622 terminal station
401 transmission-receiving antenna
402 switch
403, 403A and 403B sensing unit
404 radio transmission-receiving unit
405 switch 406 demodulation/decoding unit
407 modulation unit
408 orthogonal demodulation unit
409 synthesizer unit
410-1-410-$n$ band-pass filter unit
411-1-411-$n$ power value calculation unit
412-1-412-$n$ power ratio calculation unit
413-1-413-$n$ power value judgment unit
414-1-414-$n$ power ratio judgment unit
415 position information estimation unit
416-1-416-$n$ direction calculation unit
501 receiving antenna
502 radio receiver unit
503 demodulation/decoding unit
504, 504A and 504B utilization status estimation unit
505 radio wave detection antenna
506 sensing unit
507 signal power value judgment unit
508 signal power ratio judgment unit
509 signal power ratio threshold value calculation unit
510 comprehensive judgment unit
511 control signal generation unit
512 modulation unit
513 radio transmitter unit
514 transmission antenna
515 switch
516 signal power ratio threshold value updating unit
517 judgment result identification unit
518 comparison unit
519 memory unit
520 and 520A sensing map generation unit
521 determination unit of frequency band/area for communication
522 map format determination unit
523 mapping unit
524 memory unit
525 map interpolation unit
526 sensing terminal determination unit
527 terminal station group determination unit
528 propagation estimation unit
529 communication terminal determination unit

The invention claimed is:

1. A base station of a first radio system, which estimates a utilization status of a frequency band, the base station comprising:
an estimation unit configured to estimate a utilization status of said frequency band, on the basis of a received signal power ratio between a received signal power value of a second radio system of said frequency band and a received signal power value of the first radio system of said frequency band used by the first radio system.

2. The base station according to claim 1, wherein said estimation unit is configured to estimate a utilization status of said frequency band, using said received signal power ratio and a received signal power value of the second radio system.

3. The base station according to claim 1, wherein said estimation unit is configured to estimate a utilization status of said frequency band on the basis of a first comparison result which is a result of comparing said received signal power ratio with a predetermined signal power ratio threshold value.

4. The base station according to claim 3, wherein said estimation unit is configured to estimate a utilization status of said frequency band, on the basis of said first comparison result and a second comparison result which is a result of comparing a received signal power value of the second radio system with a predetermined signal power threshold value.

5. The base station according to claim 4, wherein said estimation unit is configured to estimate a utilization status of said frequency band using said first comparison result, if said second comparison result is such that a received signal power value of the second radio system is equal to or smaller than said signal power threshold value.

6. The base station according to claim 5, wherein said frequency band is divided into a plurality of frequency bands, and said estimation unit is configured to estimate a utilization status of each of the plurality of divided frequency bands.

7. The base station according to claim 3, further comprising:
a threshold value determination unit configured to determine said signal power ratio threshold value.

8. The base station according to claim 7, wherein said threshold value determination unit is configured to determine said signal power ratio threshold value, on the basis of received signal power ratios between the respective base stations, which are calculated by a predetermined propagation loss calculation formula using information on transmitter and receiver stations of the second radio system and the transmitter and receiver stations of the first radio system.

9. The base station according to claim 8, wherein, when said received signal power ratios are obtained by dividing received signal power values of the second radio system by a received signal power value of the first radio system, said threshold value determination unit is configured to set, in an area where received signal power values of the other radio system satisfy a predetermined signal power threshold value, a smallest received signal power ratio of the received signal power ratio as said signal power ratio threshold value.

10. The base station according to claim 8, wherein, when said received signal power ratios are obtained by dividing a received signal power value of the first radio system by received signal power values of the second radio system, said threshold value determination unit is configured to set, in an area where received signal power values of the second other radio system satisfy a predetermined signal power threshold value, a largest received signal power ratio of the received signal power ratio as said signal power ratio threshold value.

11. The base station according to claim 8, wherein said information on transmitter and receiver stations is at least one selected from among pieces of information comprising; positions of respective transmitter and receiver stations, distances between respective transmitter and receiver stations, antenna heights of respective transmitter and receiver stations, carrier wave frequencies of respective transmitter and receiver stations, and transmission power values of respective transmitter and receiver stations.

12. The base station according to claim 3 further comprising:
a threshold value updating unit configured to update said signal power ratio threshold value.

13. A terminal station which is configured to communicate with a first radio system, comprising:
an estimation unit configured to estimate a utilization status of a frequency band on the basis of a received signal power ratio between a received signal power value of a second radio system of said frequency band and a received signal power value of the first radio system of said frequency band used by the first radio system.

14. The terminal station according to claim 13, further comprising:
a sensing unit configured to transmit at least one of; a received signal power ratio between a received signal power value of the second radio system and a received signal power value of the first system, and a result of comparing said received signal power ratio with a predetermined threshold value; to said estimation unit of the terminal station or an estimation unit of another terminal station, or to an estimation unit of a base station of the first radio system.

15. A radio system including a terminal station which is configured to perform communication or broadcasting with a first radio system, the first radio system comprising:
an estimation unit configured to estimate a utilization status of a frequency band on the basis of a received signal power ratio between a received signal power value of a second radio system of said frequency band and a received signal power value of the first radio system of said frequency band used by the first radio system.

16. The radio system according to claim 15, wherein, in a cover area of the first radio system, said estimation unit is configured to determine if the frequency band is assigned to the second radio system or a priority of the second radio system to use the frequency band is higher than a priority of the first radio system to be used for communication or broadcasting.

17. The radio system according to claim 15 further comprising:
a management unit configured to manage radio resources in terms of communication or broadcasting in the first radio system, on the basis of an estimation result of said estimation unit.

18. A radio control method performed by a wireless communication apparatus of a first radio system, for estimating a utilization status of a frequency band, the radio control method, comprising:
estimating a utilization status of said frequency band, on the basis of a received signal power ratio between a received signal power value of a second radio system of said frequency band and a received signal power value of the first radio system of said frequency band used by the first radio system.

19. A non-transitory storage medium storing a program which, when executed by a processor performs a method performed by a wireless communication apparatus of a first radio system, the method comprising:
estimating a utilization status of a frequency band on the basis of a received signal power ratio between a received signal power value of a second radio system of said frequency band and a received signal power value of the first radio system of said frequency band used by the first radio system.

* * * * *

UNITED STATES PATENT AND TRADEMARK OFFICE
CERTIFICATE OF CORRECTION

PATENT NO. : 8,918,059 B2  
APPLICATION NO. : 13/498066  
DATED : December 23, 2014  
INVENTOR(S) : Kenichirou Yamazaki, Masayuki Ariyoshi and Kojiro Hamabe It is certified that error appears in the above-identified patent and that said Letters Patent is hereby corrected as shown below:

In the Specification

Column 1, Line 9: delete "Aug. 17, 2010," and insert -- Sep. 17, 2010, --

Column 1, Line 11: delete "Aug. 24, 2009," and insert -- Sep. 24, 2009, --

Signed and Sealed this  
Sixteenth Day of June, 2015

Michelle K. Lee  
*Director of the United States Patent and Trademark Office*